(12) United States Patent
Koizumi

(10) Patent No.: US 8,458,373 B2
(45) Date of Patent: Jun. 4, 2013

(54) POWER SUPPLY UNIT, PROCESSING SYSTEM, AND ID ASSIGNMENT METHOD

(75) Inventor: Takayoshi Koizumi, Ibaraki (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 12/854,565

(22) Filed: Aug. 11, 2010

(65) Prior Publication Data
US 2011/0047398 A1 Feb. 24, 2011

(30) Foreign Application Priority Data
Aug. 18, 2009 (JP) .................. 2009-189500

(51) Int. Cl.
*G06F 3/00* (2006.01)
*G06F 1/26* (2006.01)

(52) U.S. Cl.
USPC .............................. 710/9; 713/340

(58) Field of Classification Search
USPC ................. 713/300–340; 710/8–10
See application file for complete search history.

(56) References Cited

U.S. PATENT DOCUMENTS

| | | | | |
|---|---|---|---|---|
| 5,450,073 A | * | 9/1995 | Brown et al. ................. | 340/3.1 |
| 5,664,221 A | * | 9/1997 | Amberg et al. .................. | 710/9 |
| 5,715,475 A | * | 2/1998 | Munson et al. ................. | 710/10 |
| 6,237,103 B1 | * | 5/2001 | Lam et al. ..................... | 713/330 |
| 6,243,774 B1 | * | 6/2001 | Eide et al. ..................... | 710/302 |
| 6,349,235 B1 | * | 2/2002 | Gibart et al. .................... | 700/11 |
| 7,139,839 B2 | * | 11/2006 | White et al. ................... | 709/245 |
| 7,383,413 B2 | * | 6/2008 | Gershfeld et al. ............ | 711/200 |
| 8,122,159 B2 | * | 2/2012 | Monreal .......................... | 710/9 |
| 2003/0105984 A1 | * | 6/2003 | Masuyama et al. ........... | 713/330 |
| 2005/0128100 A1 | * | 6/2005 | Petrocy .................... | 340/825.52 |
| 2005/0132109 A1 | * | 6/2005 | Steger .......................... | 710/104 |

FOREIGN PATENT DOCUMENTS

JP 2005-318482 11/2005

\* cited by examiner

*Primary Examiner* — Paul R Myers
*Assistant Examiner* — Trisha Vu
(74) *Attorney, Agent, or Firm* — Dentons US LLP

(57) ABSTRACT

A power supply unit includes a communication unit and a control unit. The communication unit is capable of performing communication with a first processing unit group constituted of a plurality of processing units connected thereto. The control unit controls powers to the plurality of processing units through the communication so that the powers are turned on in an order corresponding to an order of connection and assigns, to the plurality of processing units, respectively, IDs of numbers corresponding to the order of turning-on of the powers each time the power is turned on.

11 Claims, 14 Drawing Sheets

POWER SUPPLY UNIT, PROCESSING SYSTEM, AND ID ASSIGNMENT METHOD

BACKGROUND OF THE INVENTION

1. Field of the Invention

The present invention relates to a power supply unit that controls powers to a plurality of processing units and assigns IDs to a plurality of processing units, a processing system that includes a power supply unit and a processing unit, and a method of assigning IDs.

2. Description of the Related Art

Generally, in a system in which a plurality of apparatuses are connected through communication lines, the apparatuses are specified using IDs assigned thereto, respectively.

For example, in a network such as the Internet and the Ethernet (registered trademark), apparatuses on a network are specified using IDs such as MAC addresses fixedly assigned to terminal apparatuses thereof (see, for example, Japanese Patent Application Laid-open No. 2005-318482 (paragraph 0012)) (hereinafter, referred to as Patent Document 1).

SUMMARY OF THE INVENTION

Incidentally, the inventors of the present invention have newly devised a processing system that is structured by hierarchically connecting, through an interface, a plurality of processing units that execute a predetermined processing with a plurality of power supply units that control the supply of the power to each of the processing units and the start and stop of the power thereof.

Here, for example, if the assumption is made that the processing units each have IDs fixedly given as described in Patent Document 1, the numbers of the IDs of the processing units have no correlation with respect to the order of connection with the processing units. In this case, the processing units each have to have a routing table for specifying the other units. As a result, there arises a problem in that the communication among the processing units becomes redundant.

In view of the above-mentioned circumstances, it is desirable to provide techniques such as a power supply unit and the like capable of assigning, to processing units, IDs correlated with the order of connection of the processing units.

According to an embodiment of the present invention, there is provided a power supply unit including a communication unit and a control unit.

The communication unit is capable of performing communication with a first processing unit group constituted of a plurality of processing units connected thereto.

The control unit controls powers to the plurality of processing units through the communication so that the powers are turned on in an order corresponding to an order of connection Further, the control unit assign, to the plurality of processing units, respectively, IDs of numbers corresponding to the order of turning-on of the powers each time the power is turned on.

In the embodiment of the present invention, the powers to the processing units are turned on in the order corresponding to the order of connection of the processing units, and the IDs of the numbers corresponding to the order of turning-on of the powers are assigned to the processing units, respectively. Thus, the IDs that are correlated to the order of connection of the processing units can be assigned to the processing units, respectively. In this case, the processing units each can specify another processing unit using the ID expressed by a relative value to the ID thereof and can communicate with each other. Therefore, the processing units do not have to have a routing table and do not have to refer to the routing table in the communication thereamong. As a result, a communication speed among the processing units can be improved.

Further, in the embodiment of the present invention, the IDs can be assigned each time the powers are turned on. Accordingly, at a time when the powers are turned off, for example, it is possible to properly assign, to the processing units, the IDs of the numbers correlative to the order of the connection of the processing units at a time when the powers are turned on even if the number of the processing units connected to the power supply unit is increased or reduced.

In the power supply unit, the communication unit may be capable of performing communication with at least one different power supply unit.

The different power supply unit is connected to a second processing unit group and controls powers to the second processing unit group. The second processing unit group is different from the first processing unit group.

In this case, the control unit may control the powers to the first processing unit group so that the powers are turned on in a predetermined priority order with respect to turning-on of powers to the second processing unit group through the communication with the different power supply unit.

Further, in this case, the control unit may assign the IDs of the numbers to the plurality of the processing units, respectively. The numbers correspond to numbers in accordance with the priority order of turning-on of the powers to the first processing unit group with respect to turning-on of the powers to the second processing unit group and corresponds to the order of turning-on of the powers in the first processing unit group.

In the embodiment of the present invention, the power supply unit can turn on the powers to all the processing units including at least the first processing unit group and the second processing unit group sequentially in the order of connection in conjunction with the at least one different power supply unit. In addition, the power supply unit can assign the IDs of the numbers corresponding to the order of turning-on of the all the processing units to the processing units in conjunction with the different power supply unit. Accordingly, the power supply unit can assign the IDs correlated to the order of connection of all the processing units to the processing units, respectively, in conjunction with the different power supply unit.

In the power supply unit, the control unit may control the powers so that the plurality of processing units in the first processing unit group are sequentially started up from a rear stage side in an electrical connection relationship.

Here, for example, in the case where the PCI-Express (registered trademark) is used for the connection of the units, there may arise a problem in that the plurality of processing units are necessary to be started up in sequence from the rear stage side due to a problem of device recognition in Root/End connection.

In the embodiment of the present invention, the plurality of processing units can be started up sequentially from the rear stage side, so it is possible to flexibly deal with the above-mentioned problem.

In the power supply unit, the control unit may output a confirmation signal to confirm whether the different power supply unit in a rear stage is connected to the rear stage side in the electrical connection relationship.

Further, in this case, the control unit may judge whether a response signal to the confirmation signal is input from the different power supply unit in the rear stage.

In the power supply unit, when the response signal is not input, the control unit may control the powers so that the first processing unit group is started up sequentially from the rear stage side.

Further, when the response signal is input, the control unit may control the powers so that the first processing unit group connected thereto is started up sequentially from the rear stage side after a startup completion signal is input. The startup completion signal indicates that startup of the second processing unit group connected to the different power supply unit in the rear stage is completed.

As a result, it is possible to turn on the powers sequentially from the processing unit in the last stage connected to the power supply unit in the last stage and assigns the IDs of the numbers corresponding to the order of turning-on to the processing units, respectively.

In the power supply unit, when the response signal is not input, the control unit may assign the IDs of the numbers corresponding to the order of turning-on to the plurality of processing units, respectively, and output, to the different power supply unit in a front stage, information of the number of the ID assigned last time.

Further, when the response signal is input, the control unit may assign the IDs of the numbers corresponding to the order of turning-on to the plurality of the processing units, respectively, based on information of the number of the ID from the different power supply unit in the rear stage, and output, to the different power supply unit in the front stage, information of the number of the ID assigned last time.

In the power supply unit, the control unit may judge whether the power supply unit is a head power supply unit or a relay power supply unit in a relationship with the different power supply unit.

In this case, the control unit may control, based on a judgment result as to whether the power supply unit is the head power supply unit or the relay power supply unit, the powers so that the powers to the first processing unit group are turned on in the predetermined priority order with respect to the turning-on of the powers to the second processing unit group through the communication with the different power supply unit.

Further, in this case, the control unit may assign the IDs of the numbers to the plurality of processing units, respectively. The numbers corresponds to the order of turning-on of the powers in the first processing unit group and corresponds to the priority order of turning-on of the first processing unit group with respect to turning-on of the powers to the second processing unit group.

In the embodiment of the present invention, the power supply unit automatically judges whether the power supply unit concerned is the head power supply unit or the relay power supply unit. Thus, regardless of the position where the power supply unit is connected to the different power supply unit, it is possible to cause the power supply unit to effectively operate, and assign the IDs correlated to the order of connection of all the processing units to the processing units, respectively.

The power supply unit may further include a power supply switch.

In this case, the control unit may judge, based on a shift of the power supply switch thereof, that the power supply unit including the power supply switch shifted is the head power supply unit in the relationship with the different power supply unit.

In the embodiment of the present invention, when the power supply switch is shifted, the power supply unit including the power supply switch shifted is judged to be the head power supply unit. With this structure, it is possible to handle the case where the power supply units are connected in the ring-shaped form. Even in this case, it is possible to cause the power supply units to effectively operate, and assign the IDs correlated to the order of connection of all the processing units to the processing units, respectively.

According to another embodiment of the present invention, there is provided a processing system including a processing unit group and a power supply unit.

The processing unit group is constituted of a plurality of processing units.

The power supply unit includes a communication unit and a control unit.

The communication unit is capable of performing communication with the processing unit group connected thereto.

The control unit controls powers to the plurality of processing units through the communication so that the powers are turned on in an order corresponding to an order of connection.

Further, the control unit assigns, to the plurality of processing units, respectively, IDs of numbers corresponding to the order of turning-on of the powers each time the power is turned on.

According to another embodiment of the present invention, there is provided a processing system including a plurality of processing unit groups and a plurality of power supply units.

The plurality of processing unit groups are each constituted of a plurality of processing units; and The plurality of power supply units each includes a communication unit and a control unit.

The communication unit is capable of performing communication with a first processing unit group connected thereto Further, the communication unit is capable of performing communication with at least one different power supply unit that is connected with a second processing unit group different from the first processing unit group and controls powers to the second processing unit group.

The control unit controls the powers to the first processing unit group so that the powers are turned on in an order corresponding to an order of connection through the communication with the first processing unit group.

Further, the control unit controls the powers so that the powers of the first processing unit group are turned on in a predetermined priority order with respect to turning-on of powers to the second processing unit group through the communication with the different power supply unit.

Furthermore, the control unit assigns the IDs of the numbers to the plurality of the processing units, respectively. The numbers corresponds to numbers in accordance with the priority order of turning-on of the powers to the first processing unit group with respect to turning-on of the powers to the second processing unit group and corresponds to the order of turning-on of the powers in the first processing unit group.

According to an embodiment of the present invention, there is provided an ID assignment method. The ID assignment method includes controlling powers to a plurality of processing units connected to a power supply unit through communication with the plurality of processing units so that the powers to the plurality of processing units are turned on in an order corresponding to an order of connection.

Further, the ID assignment method includes assigning, to the plurality of processing units, respectively, IDs of numbers corresponding to the order of turning-on of the powers each time the power is turned on.

As described above, according to the embodiments of the present invention, it is possible to provide the technique such as the power supply unit and the like capable of assigning the IDs correlated to the order of connection of the processing units to the processing units, respectively.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

First Embodiment (Overall Structure of Processing System and Structures of Respective Portions)

Figure 1:
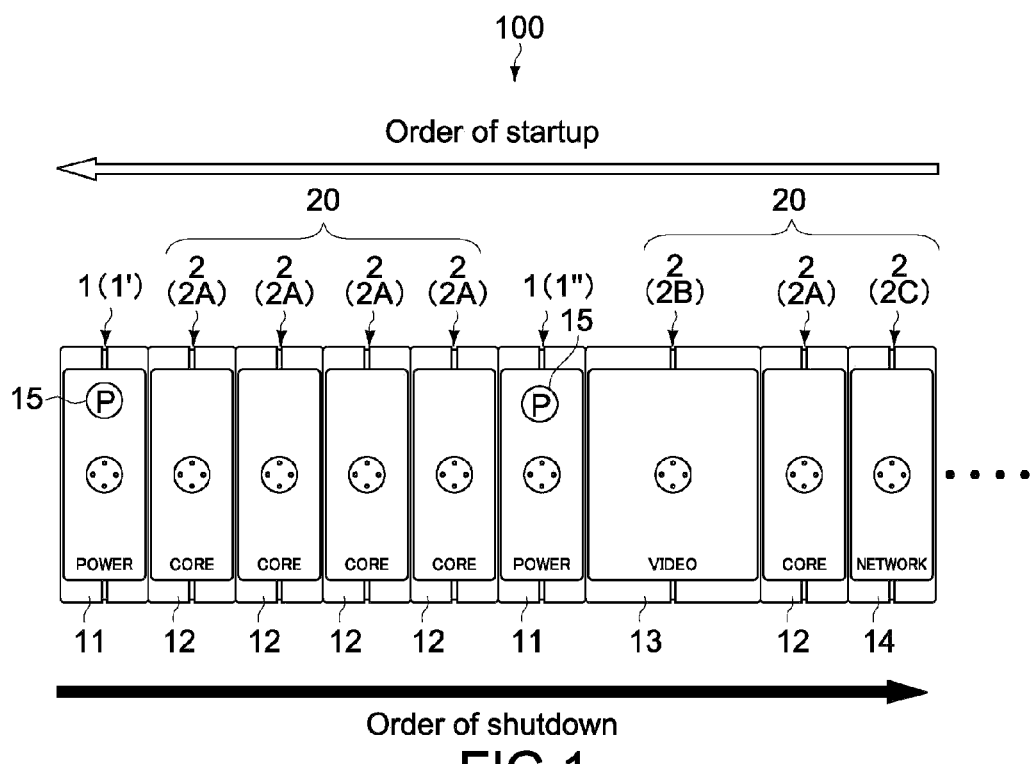
FIG. 1 is a diagram showing a processing system according to an embodiment of the present invention.
Figure 2:
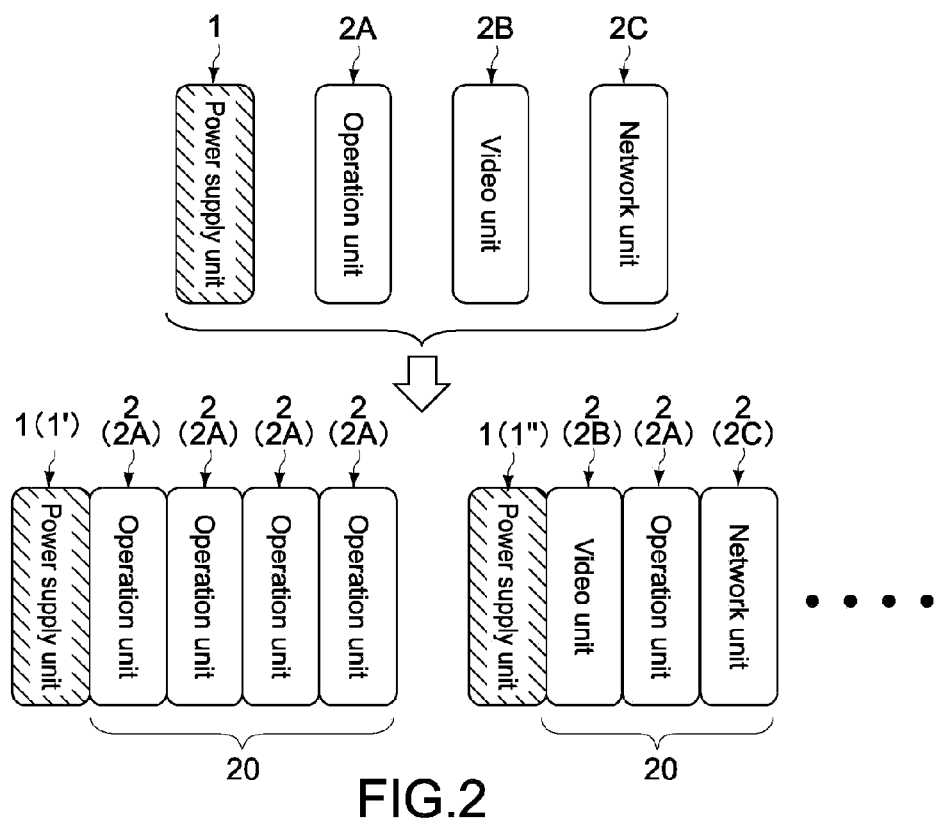
FIG. 2 is a schematic diagram showing the processing system according to the embodiment of the present invention.

FIG. 1 is a diagram showing a processing system according to a first embodiment of the present invention. FIG. 2 is a schematic diagram showing the processing system.

As shown in FIGS. 1 and 2, a processing system 100 includes a plurality of power supply units 1 and a plurality of processing units 2.

The processing unit 2 is formed of an operation unit 2A, a video unit 2B, or a network unit 2C. It should be noted that, in this specification, the processing unit 2 refers to one of the operation unit 2A, the video unit 2B, and the network unit 2C.

As shown in FIG. 2, a user can arbitrarily select necessary units in accordance with a necessary size from among the power supply unit 1, the operation unit 2A, the video unit 2B, and the network unit 2C, to freely structure the processing unit 100.

The power supply unit 1 includes a casing 11 having a rectangular parallelepiped shape. On the front surface side of the casing 11, a power supply switch 15 that is exposed from the front surface of the casing 11 is provided. It should be noted that the shape of the casing 11 or the position of the power supply switch 15 can be changed as appropriate.

The power supply unit 1 includes a microcontroller 5 (control unit) (see, FIG. 3) in the casing 11. The microcontroller 5 controls the supply of the power to the respective processing units 2, the start and stop of the power supply, the assignment of IDs, and the like.

In the following description, a group of the processing units 2 that is subjected to the control on the supply of the power, the start and stop thereof, the assignment of the IDs, and the like by one power supply unit 1 is referred to as a processing unit group 20. Further, in the following description, all the processing units included in the processing system 100 are referred to as all processing units.

The maximum number of processing units 2 included in the processing unit group 20, that is, the maximum number of processing units 2 connected to the one power supply unit 1 is predetermined, for example, set to four. It should be noted that the maximum number of units connected can be changed as appropriate.

The operation unit 2A includes a casing 12 having a rectangular parallelepiped shape. In the casing 12, a CPU board on which a CPU (central processing unit) (or MPU (micro processing unit)) or the like is mounted is incorporated.

The video unit 2B includes a casing 13 having a rectangular parallelepiped shape. In the casing 13, a graphic board on which a GPU (graphics processing unit), a VRAM (video random access memory), or the like is mounted is incorporated.

The network unit 2C includes a casing 14 having a rectangular parallelepiped shape. In the casing 14, a network board is incorporated.

The units 1 and 2 are electrically connected to one another through a power supply line. In addition, the units are electrically connected to one another by an apparatus interface such as a PCI-Express.

In the description of the first embodiment, out of the plurality of power supply units 1, the power supply unit 1 disposed on the left end is referred to as a head power supply unit 1', and the other power supply units 1 are referred to as relay power supply units 1". In addition, in the description of the first embodiment, in the positional relationship among the units 1 and 2, the left side may be referred to as a front stage, and the right side may be referred to as a rear stage.

Here, in FIG. 1, the order of start and the order of stop in the processing system 100 are shown. In this embodiment, based on the control of the power supply unit 1 (microcontroller 5), the powers to the processing units 2 are turned on sequentially from the rear stage side, and the powers to the processing units 2 are turned off sequentially from the front stage side, as shown in FIG. 1.

The turning-on and -off of the powers to the units is controlled in the above-mentioned orders for the following reason.

As described above, for the connection of the units, the PCI-Express is used. In the case where the PCI-Express is used for the connection of the units, there arises a problem in that the processing units are necessary to be started up and shut down in a predetermined order due to a problem of device recognition in Root/End connection. In view of this, in this embodiment, the powers to the processing units 2 are turned on sequentially from the rear stage side and turned off sequentially from the front stage side. It should be noted that the details of the power supply control by the power supply unit 1 (microcontroller 5) will be described later.

Figure 3:
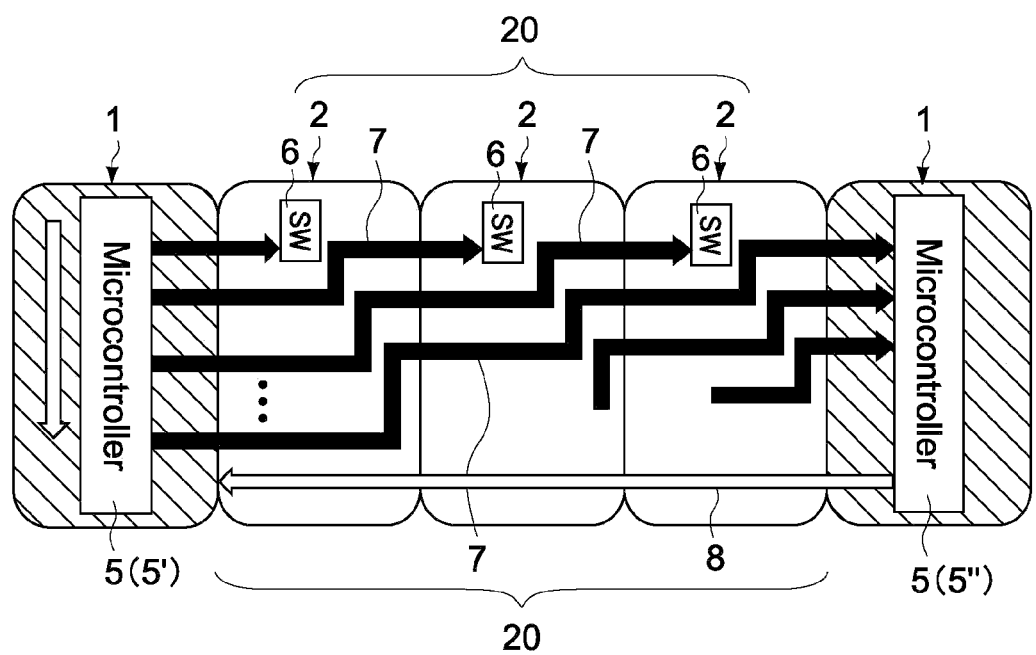
FIG. 3 is a schematic diagram showing a connection state among units that constitute the processing system.

FIG. 3 is a schematic diagram showing a connection state among the units.

As shown in FIG. 3, in the power supply unit 1, the microcontroller 5 is provided, and in the processing unit 2, the switch 6 for turning on and off the power is provided. A microcontroller 5' of the power supply unit 1 in the front stage (left side in FIG. 3) is electrically connected to the switches 6 of the processing unit group 20 disposed on the rear stage side through control signal lines 7. The microcontroller 5' outputs a startup control signal or a stop control signal through the control signal lines 7, to control the turning-on and -off of the power to the processing unit group 20 connected thereto.

The microcontroller 5' of the power supply unit 1 in the front stage is electrically connected to a microcontroller 5" of the power supply unit 1 in the rear stage (right side in FIG. 3) through the control signal line 7. It should be noted that the microcontroller 5' on the front stage side and the microcontroller 5" on the rear stage side are electrically connected to each other also through a signal line 8.

The control signal lines 7 from the microcontroller 5' are shifted to an upper level stepwise in each of the processing units 2. That is, the control signal lines 7 are shifted to the upper level stepwise from the input side to the output side in each of the processing units 2.

The reason why the control signal lines 7 from the micro controller 5 are shifted to the upper level stepwise in each of the processing units 2 will be described.

As described above, the user can arbitrarily select necessary units 1 and 2 from the units 1 and 2 to structure the processing system 100 according to this embodiment. In this case, the number of processing units 2 connected to one power supply unit 1 and the connected positions thereof are unclear.

The assumption is made that the control signal lines 7 are not shifted to the upper level stepwise from the input side and the output side in the processing unit 2 but set at the same level. In this case, depending on a position where the processing unit 2 is connected to the power supply unit 1, the control signal lines 7 through which the startup and shutdown control signals are input from the microcontroller 5 are different for the processing units 2.

In view of this, in this embodiment, the control signal lines 7 from the microcontroller 5 are shifted to the upper level stepwise in each of the processing units 2. With this structure, as shown in FIG. 3, even if the processing units 2 are disposed at any positions, the startup and shutdown control signals from the microcontroller 5' can be input from the uppermost control signal line 7. Thus, regardless of the positions where the processing units 2 are connected to the power supply unit 1, the processing units 2 can be effectively started up and shut down.

(Description on Operation)

Next, the operation of the processing system 100 will be described. It should be noted that the operation of the power supply unit 1 will be mainly described in the description on the operation of the processing system 100.

(Processing at Time when Power is Turned on)

First, the operation when the power to the processing system 100 is turned on will be described.

Figure 4:
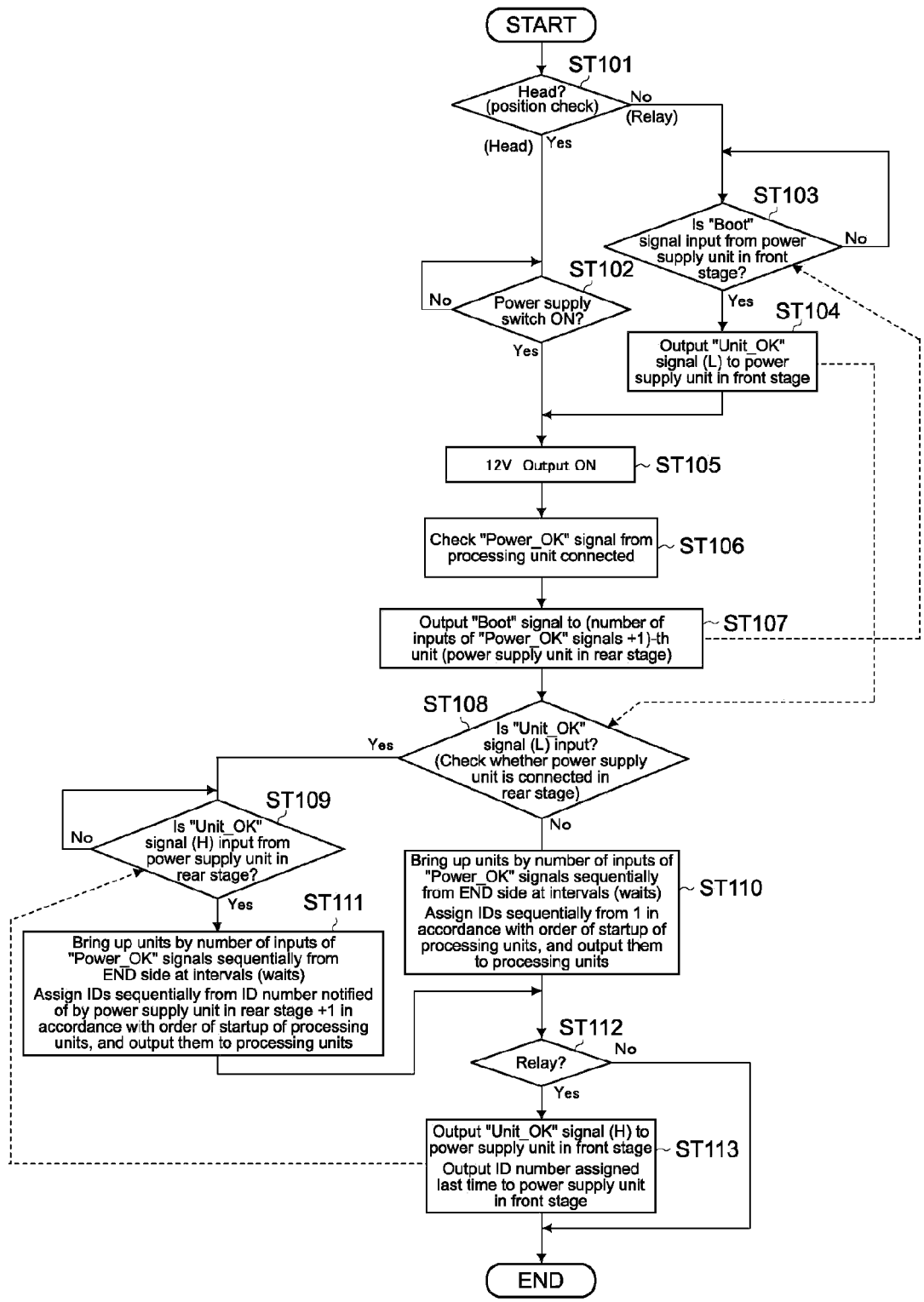
FIG. 4 is a flowchart showing an operation in the case where a power supply unit turns on a power to a processing unit and assigns IDs of numbers corresponding to an order of startup to processing units.
Figure 5:
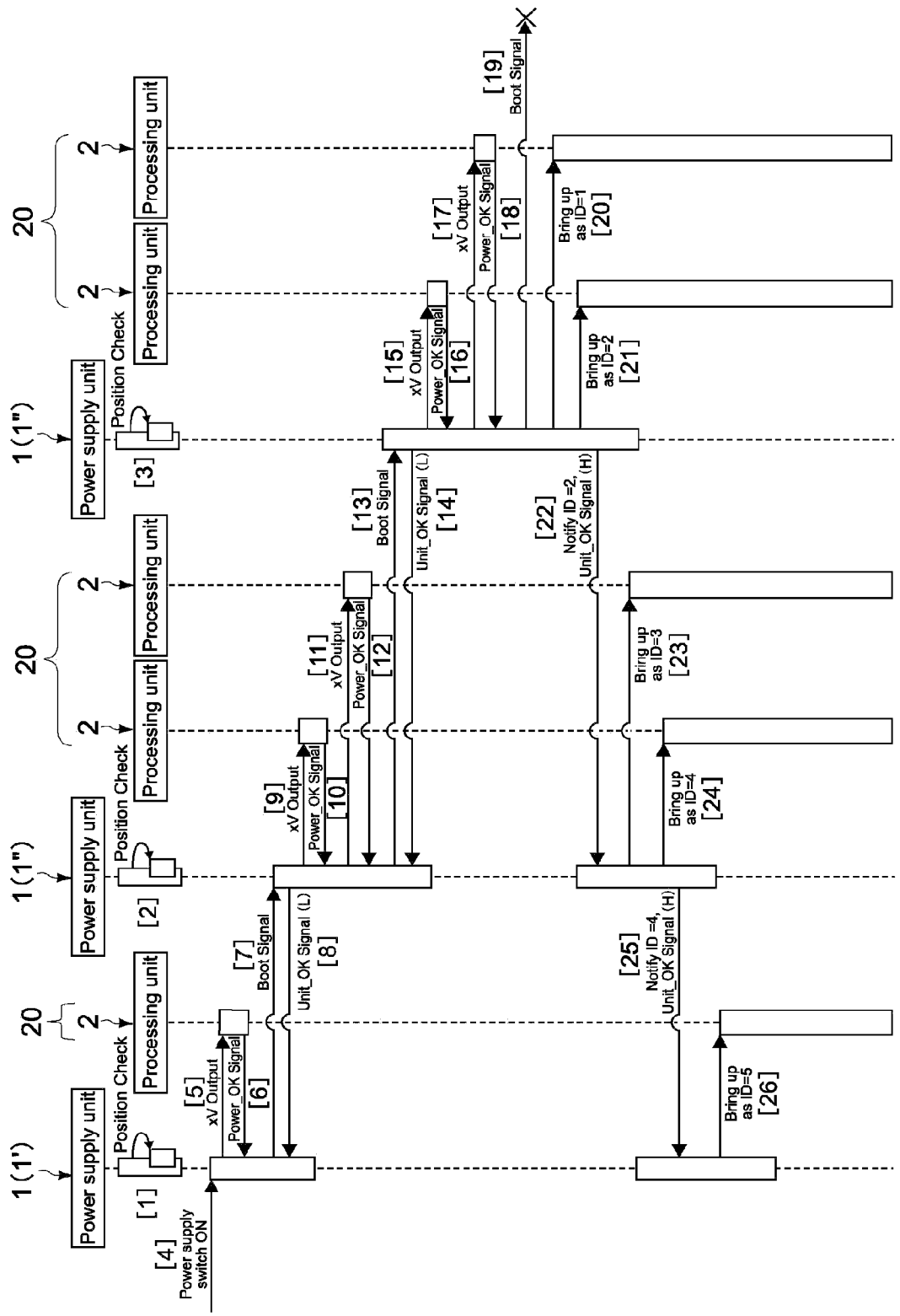
FIG. 5 is a sequence diagram showing a startup operation of the processing system according to the embodiment of the present invention.

FIG. 4 is a flowchart showing an operation in the case where the power supply unit turns on the power to the processing unit and assigns IDs of numbers corresponding to the order of the turning-on of the powers to the processing units. FIG. 5 is a sequence diagram showing an operation at the time when the processing system is startup. It should be noted that, in FIG. 5, the structure of the processing system is simplified for ease of the explanation.

The microcontroller 5 of the power supply unit 1 judges whether the power supply unit 1 concerned is the head power supply unit 1' or the relay power supply unit 1" based on the relationship with the other power supply units 1 (Step 101) (see, FIG. 5, [2], and [3]). Typically, the microcontroller 5 of the power supply unit 1 judges whether the other power supply units 1 are connected in the rear stage. Based on the judgment result, the connected position thereof is determined.

In the case where it is judged that the power supply unit 1 concerned is the head one (YES in Step 101), the microcontroller 5 judges whether a user presses the power supply switch 15 provided on the front side of the power supply unit 1, and a signal of turning on the power supply switch is input from the power supply switch 15 (Step 102).

In the case where the user presses the power supply switch 15, and the signal of turning on the power supply switch is input from the power supply switch 15 (YES in Step 102), the microcontroller 5 performs the subsequent processing of Step 105. On the other hand, in the case where the signal of turning on the power supply switch is not input from the power supply switch 15 (NO in Step 102), the process returns to Step 102 again, and the microcontroller 5 judges whether the signal of turning on the power supply switch is input or not.

That is, when the power supply unit 1 is judged to be the head power supply unit 1', the power supply unit 1' is brought into a standby state of turning on the power supply switch 15 provided thereto.

In Step 101, when the power supply unit 1 is not judged to be the head power supply unit (NO in Step 101), that is, when the power supply unit 1 concerned is judged to be the relay power supply unit 1", the microcontroller 5 performs the processing of Step 103.

In Step 103, the microcontroller 5 judges whether a "Boot" signal is input from the power supply unit 1 in the front stage through the control signal line 7.

In the case where the "Boot" signal is input from the power supply unit 1 in the front stage (YES in Step 103), the process proceeds to Step 104. On the other hand, in the case where the "Boot" signal is not input (NO in Step 103), the process returns to Step 103, and the microcontroller 5 judges again whether the "Boot" signal is input from the power supply unit 1 in the front stage.

That is, when the power supply unit 1 concerned is judged to be the relay power supply unit 1", the power supply unit 1" is brought into a standby state of the input of the "Boot" signal from the power supply unit 1 in the front stage.

In the case where the "Boot" signal is input from the power supply unit 1 in the front stage (YES in Step 103) (see, FIG. 5 and [13]), the microcontroller 5 outputs a "Unit_OK" signal (Low) to the power supply unit 1 in the front stage through the signal line 8 (Step 104) (see, FIG. 5 and [14]).

In the case where the user presses the power supply switch 15, and the signal of turning on the power supply switch is input from the power supply switch 15 in Step 102 (see, FIG. 5), or in the case where the "Unit_OK" signal (L) is output to the power supply unit 1 in the front stage in Step 104 (see, FIG. 5 and [14]), the microcontroller 5 performs the subsequent processing of Step 105.

In Step 105, the microcontroller 5 supplies a voltage of 12 V to the processing unit group 20 connected thereto (see, FIG. 5, [9], [11], [15], and [17]).

When the voltage of 12 V is supplied from the power supply unit 1, the processing units 2 each output a "Power_OK." signal to the power supply unit 1 (see, FIG. 5, [10], [12], [16], and [18]). It should be noted that the voltage supplied to the processing units 2 is not limited to 12 V, and can of course be another value.

Next, the microcontroller 5 counts the inputs of the "Power_OK." signals from the processing unit group 20 connected thereto (Step 106). By counting the inputs of the "Power_OK" signals, the microcontroller 5 can recognize the number of processing units 2 connected thereto.

When the inputs of the "Power_OK" signals are counted, the microcontroller 5 outputs the "Boot" signal to the (number of inputs of "Power_OK" signals+1)-th unit (i.e., power supply unit 1 in the rear stage) through the control signal line 7 (Step 107) (see, FIG. 5, [13], and [19]).

When the "Boot" signal is output, the microcontroller 5 judges whether the "Unit_OK" signal (L) is input from the power supply unit 1 in the rear stage (Step 108).

In the case where the power supply unit 1 is connected in the rear stage, the "Unit_OK" signal (L) is input from the power supply unit 1 in the rear stage (Steps 103 and 104) (see, FIG. 5 and [14]).

On the other hand, in the case where the power supply unit 1 is not connected in the rear stage, the "Unit_OK." signal (L) is not input (see, FIG. 5).

Thus, the microcontroller 5 can confirm whether the power supply unit 1 is connected in the rear stage.

In the case where the "Unit_OK." signal (L) is input from the power supply unit 1 in the rear stage (YES in Step 108), the microcontroller 5 judges whether the "Unit_OK." signal (High) is input from the power supply unit 1 in the rear stage (Step 109).

In the case where the "Unit_OK." signal (H) is input from the power supply unit 1 in the rear stage (YES in Step 109), the process proceeds to Step 111. On the other hand, in the case where the "Unit_OK" signal (H) is not input from the power supply unit 1 in the rear stage (NO in Step 109), the microcontroller 5 performs the processing of Step 109 again and judges whether the "Unit_OK" signal (H) is input from the power supply unit 1 in the rear stage.

That is, in the case where the power supply unit 1 is connected in the rear stage, the power supply unit 1 is brought into a standby state of the input of the "Unit_OK" signal (H) from the power supply unit 1 in the rear stage.

In Step 108, in the case where the "Unit_OK" signal (L) is not input (NO in Step 108), the microcontroller 5 performs the subsequent processing of Step 110. That is, in the case where the power supply unit 1 is not connected in the rear stage (in the case where the power supply unit 1 concerned is disposed in the last stage), the microcontroller 5 performs the processing of Step 110.

In Step 110, the microcontroller 5 outputs the startup control signals to the units by the number of inputs of the "Power_OK." signals sequentially from the END side with an interval (wait) being given therebetween (see, FIG. 5 and [21]). As a result, the power is turned on sequentially from the processing unit 2 in the last stage in the processing unit group 20 connected to the power supply unit 1 in the last stage.

Further, in Step 110, the microcontroller 5 assigns IDs from 1 sequentially in the order of the startup of the processing units 2 and outputs the IDs to the processing units (FIG. 5 and [21]). In this case, in the processing unit group 20 connected to the power supply unit in the last stage, the assignment of the IDs=1, 2, . . . is started from the processing unit 2 on the rear stage side sequentially.

When the processing of Step 110 is terminated, and the startup of the processing unit group 20 connected thereto and the assignment of the IDs are completed, the microcontroller 5 judges whether the power supply unit concerned is the relay power supply unit 1" (Step 112). In the case where the power supply unit 1 concerned is the relay power supply unit 1" (YES in Step 112), a "Unit_OK." signal (H) is output to the power supply unit 1 in the front stage (Step 113) (see, FIG. 5).

In addition, in this case, the microcontroller 5 outputs, to the power supply unit in the front stage, a number of an ID assigned last time to the processing unit group 20 connected thereto (see, FIG. 5). In the example shown in FIG. 5, the power supply unit 1 in the last stage assigns the ID number of 2, and therefore the information of the ID=2 is output to the processing unit in the front stage.

In Step 109, when the "Unit_OK." signal (H) is input to the power supply unit 1 in the standby state of the "Unit_OK" signal (H) from the power supply unit 1 in the rear stage (YES in Step 109), the microcontroller 5 executes the processing of Step 111.

That is, upon input of the "Unit_OK." signal (H) from the power supply unit in the rear stage, the microcontroller 5 sequentially turns on the powers to the processing units 2 from the rear stage side, out of the processing unit group 20 connected thereto (see, FIG. 5, [24], and [26]).

In addition, in Step 111, the microcontroller 5 assigns the IDs from the number of (ID number sent from the power supply unit 1 in the rear stage +1) sequentially in the order of the startup of the processing units, and outputs the IDs to the processing units (see, FIG. 5, [24], and [26]).

When the processing of Step 111 is terminated, and the startup of the processing unit group 20 connected thereto and the assignment of the IDs are completed, the microcontroller 5 then performs the processing of Step 112 and judges whether the power supply unit 1 concerned is the relay power supply unit 1". In the case where the power supply unit 1 concerned is judged to be the relay power supply unit 1", the "Unit_OK" signal (H) is output to the power supply unit 1 in the front stage, and the number of the ID assigned last time by the power supply unit concerned is output to the power supply unit in the front stage (see, FIG. 5).

On the other hand, in Step 112, in the case where the power supply unit concerned is judged to be the head one (NO in Step 112), the "Unit_OK" signal (H) and the ID number assigned last time by the power supply unit concerned are not output, and the processing is terminated.

By the processing shown in FIG. 4, the power supply unit 1 can sequentially startup all the processing units in sequence from the rear stage side to the front stage side in conjunction with the other power supply units 1. As a result, it is possible to avoid the problem of the order of turning on the powers in the case where the PCI-Express is used for the connection of the units described above.

Further, by the processing shown in FIG. 4, when the powers are turned on, the power supply units 1 can assign, to the processing units, ID numbers corresponding to the order of turning-on of the powers to all the processing units in conjunction with the other power supply units 1. As a result, for example, as shown in the example of FIG. 5, the power supply units 1 can assign the IDs (=1, 2, 3, . . . ) to the processing units 2 from the rear stage side to the front stage side in conjunction with the other power supply units.

As described above, in this embodiment, the IDs of the numbers corresponding to the order of turning-on of the powers to all the processing units are assigned to the processing units, respectively, with the result that the IDs of the numbers correlative to the order of the connection of the processing units 2 can be assigned to the processing units 2, respectively.

Each of the processing units 2 to which the IDs are assigned specifies the other processing units 2 using IDs indicated by relative values to the ID thereof, to mutually perform communication. Thus, in this embodiment, the processing units 2 do not have to have a routing table and do not have to refer to the routing table for the communication with the other processing units, resulting in the improvement of the communication speed among the processing units and the improvement of the processing speed.

In addition, the power supply units 1 according to this embodiment can assign the IDs to the processing units 2 each time the power to the processing unit 2 is turned on. Thus, it is possible to deal with the increase and reduction in number of the processing units 2 included in the processing system 100.

For example, the assumption is made that the user increases the number of processing units for expanding the size of the processing system 100 in the state where the power is off. When the power is turned on thereafter, the IDs of numbers corresponding to the order of the startup (the order of the connection) of all the processing units including the processing units added are assigned to the processing units, respectively. Further, for example, in the case where the number of processing units included in the processing system 100 are reduced, the IDs of the numbers corresponding to the order of the startup (the order of the connection) of all the processing units after the reduction in number thereof are assigned to the processing units, respectively.

In this way, in the processing system 100 according to this embodiment, even if the number of the processing units 2 included in the processing system 100 is increased or reduced, it is possible to properly assign, to the processing units 2, respectively, the IDs of the numbers correlative to the order of the connection of the processing units.

Further, the power supply unit 1 in this embodiment automatically judges whether the power supply unit 1 concerned is the head power supply unit 1' or the relay power supply unit 1". Therefore, regardless of the position where the user disposes the power supply unit 1, the power supply unit 1 can effectively operate and properly assign the IDs to the processing units, respectively.

(Operation of Processing System after Assignment of IDs)

Next, a description will be given on an operation in the case where the processing units 2 communicate with each other using the IDs assigned by the power supply units and execute an application program.

Figure 6:
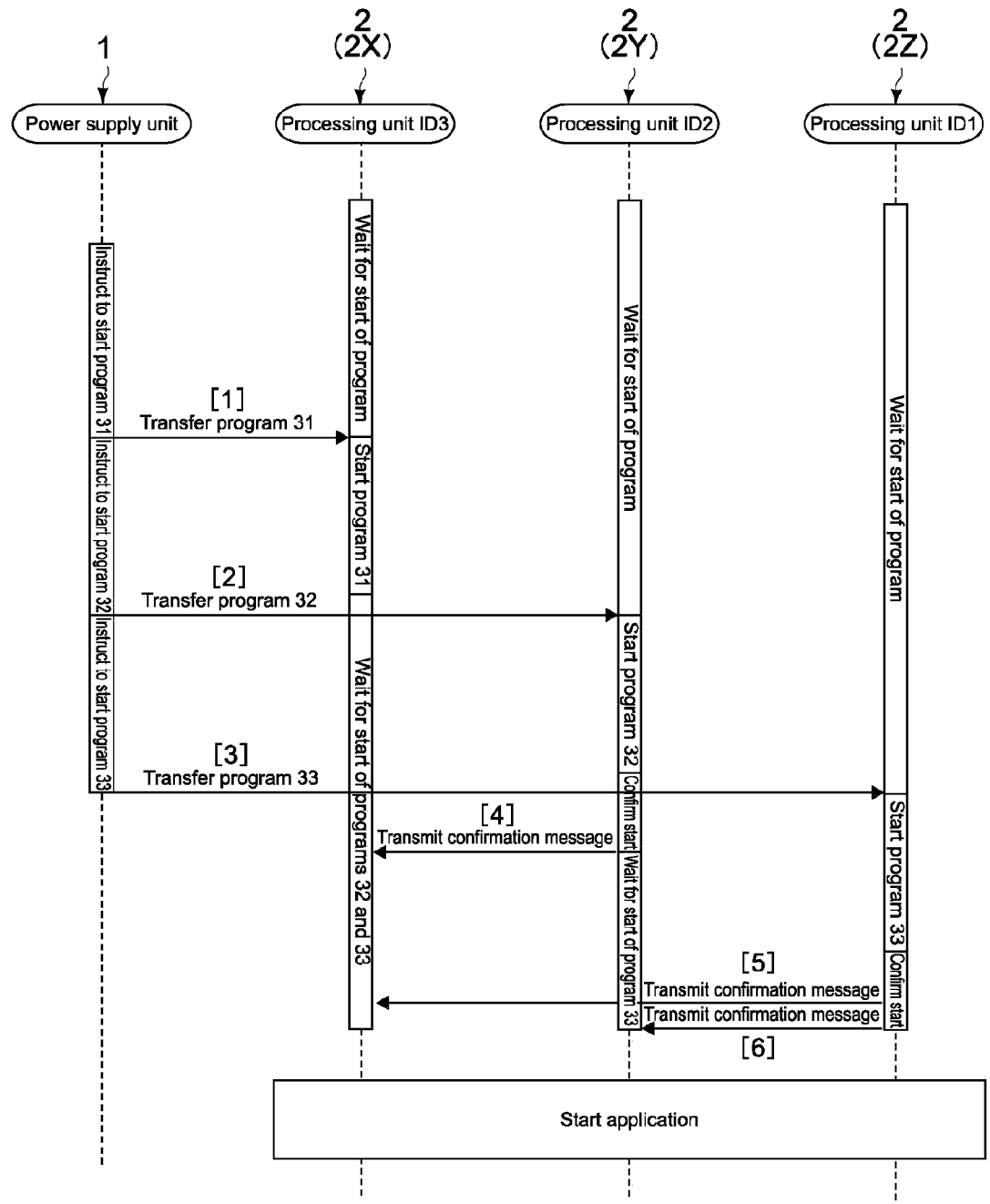
FIG. 6 is a diagram showing an example of an operation in the case where the processing units mutually communicate with each other using the IDs assigned by the power supply unit and execute an application program.
Figure 7:
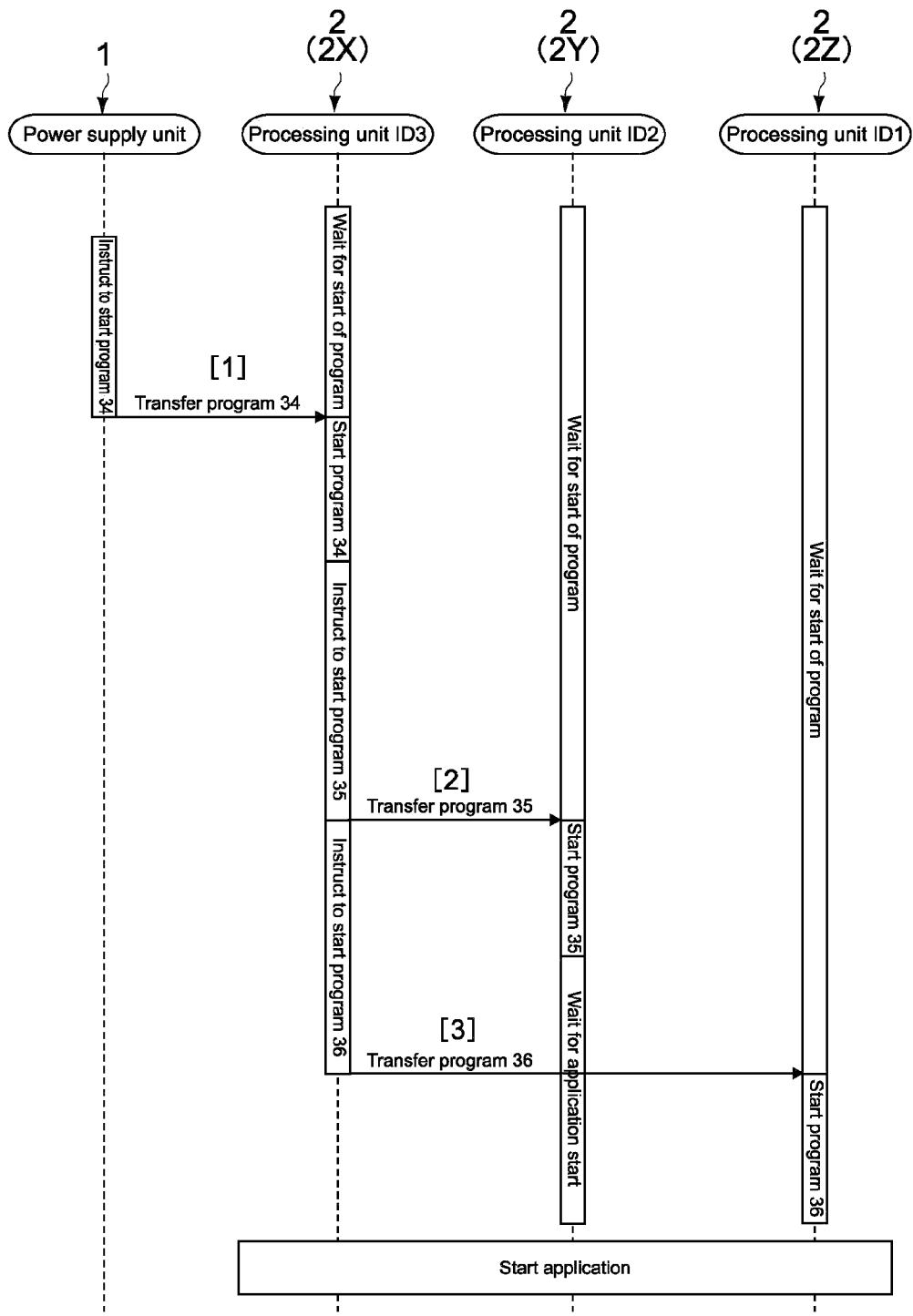
FIG. 7 is a diagram showing an example of an operation in the case where the processing units mutually communicate with each other using the IDs assigned by the power supply unit and execute an application program.

FIGS. 6 and 7 are flow diagrams each showing the operation in that case. It should be noted that in the description with reference to FIGS. 6 and 7, the processing units 2 are referred to as a first processing unit 2X, a second processing unit 2Y, and a third processing unit 2Z from the front stage side in sequence as a matter of convenience. In addition, in the description with reference to FIGS. 6 and 7, the ID=3 is assigned to the first processing unit 2X, the ID=2 is assigned to the second processing unit 2Y, and the ID=1 is assigned to the third processing unit 2Z as a matter of convenience.

First, a description will be given with reference to FIG. 6.

When the power supply unit 1 powers on the first to third processing units 2X, 2Y, and 2Z and assigns IDs thereto, the first to third processing units 2X, 2Y, and 2Z each are brought into a standby state of start of a program.

To cause the processing units 2 to execute an application program, the power supply unit 1 (microcontroller 5) determines the processing unit 2 that is to be caused to execute the application program. In this case, the power supply unit 1 determines the number of processing units 2 to be used and the processing unit 2 that is to be caused to execute the application program.

For example, the power supply unit 1 determines that three processing units, i.e., the first processing unit 2X, the second processing unit 2Y, and the third processing unit 2Z are caused to execute one application program in cooperation with one another. In the case where another processing unit 2 is connected, the power supply unit 1 may cause the processing unit 2 to execute another application program.

The power supply unit 1 transfers a program 31 to the first processing unit 2X (ID=3) and outputs a program start signal (see, FIG. 6). The first processing unit 2X starts the program 31 based on the program start signal from the power supply unit 1.

Here, the program 31 is programmed so that an application is executed with another processing unit specified by myID−1 and another processing unit 2 specified by myID−2 cooperating with each other. In the example shown in FIG. 6, because the ID of the first processing unit 2X is 3, myID−1=2 and myID−2=1 are obtained. Therefore, the first processing unit 2X cooperates with the second processing unit 2Y (ID=2) to the immediate right thereof (rear side by one stage) and the third processing unit 2Z (ID=1) next but one on the right-hand side thereof (rear side by two stages) to execute the application.

When the program 31 is started, the first processing unit 2X is brought into a standby state of the start of programs 32 and 33.

When outputting a program start signal with respect to the first processing unit 2X, the power supply unit 1 transfers the program 32 to the second processing unit 2Y (ID=2) and outputs the program start signal (see, FIG. 6).

The second processing unit 2Y starts the program 32 based on the program start signal from the power supply unit 1.

The program 32 is programmed so that the application is executed with another processing unit 2 specified by myID+1 and the processing unit 2 specified by myID−1 cooperating with each other. The ID of the second processing unit 2Y is 2, so myID+1=3 and myID−1=1 are obtained. Therefore, the second processing unit 2Y performs the application in cooperation with the first processing unit 2X (ID=3) to the immediate left thereof (front side by one stage) and the third processing unit 2Z (ID=1) to the immediate right thereof (rear side by one stage).

When the program 32 is started, the second processing unit 2Y performs a start confirmation and outputs a confirmation message to the processing unit 2×(ID=3=myID+1) (see, FIG. 6). Upon output of the confirmation message to the first processing unit 2X, the processing unit 2Y is brought into a standby state of the start of the program 33.

When the program start signal is output to the second processing unit 2Y, the power supply unit 1 transfers the program 33 to the third processing unit 2Z and outputs the program start signal (see, FIG. 6).

Based on the program start signal from the power supply unit 1, the third processing unit 2Z starts the program 33.

The program 33 is programmed so that the application is executed with another processing unit 2 specified by myID+2 and the processing unit 2 specified by myID+1 cooperating with each other. The ID of the third processing unit 2Z is 1, so myID+2=3 and myID+1=2 are obtained. Therefore, the third processing unit 2Z executes the application in cooperation with the first processing unit 2X (ID=3) next but one on the left-hand side thereof (front side by two stages) and the second processing unit 2Y (ID=2) to the immediate left thereof (front side by one stage).

When the program 33 is started, the third processing unit 2Z performs the start confirmation and outputs a confirmation message to the first processing unit 2X (ID=3=myID+2) and the second processing unit 2Y (ID=2=myID+1) (see, FIG. 6 and [6]).

After that, the first to third processing units 2X, 2Y, and 2Z each specify a communication target with the use of the ID expressed by the relative value to the ID thereof when necessary, to execute the application in cooperation with each other.

Next, a description will be given with reference to FIG. 7.

FIG. 7 shows the case where the first processing unit 2X representatively executes the processing such as a start instruction of a program.

When the power supply unit 1 turns on the powers to the first to third processing units 2X, 2Y, and 2Z and assigns the IDs thereto, the first to third processing units 2X, 2Y, and 2Z are brought into a standby state of the start of each program.

The power supply unit 1 transfers a program 34 to the first processing unit 2x and outputs a program start signal (see, FIG. 7).

Based on the program start signal from the power supply unit 1, the first processing unit 2X starts the program 34. Next, based on the program 34, the first processing unit 2X transfers a program 35 to the processing unit 2 specified by myID−1 and outputs a program start signal. The ID of the first processing unit 2X is 3, so myID−1=2 is obtained. Therefore, the first processing unit 2X transfers the program 35 to the second processing unit 2Y (ID=2) to the immediate right thereof and outputs the program start signal (see, FIG. 7).

Based on the program start signal from the first processing unit 2X, the second processing unit 2Y starts the program 35. The program 35 is programmed so that the application is executed with the processing unit 2 specified by myID+1 and the processing unit 2 specified by myID−1 cooperating with each other. Therefore, the second processing unit 2Y executes the application in cooperation with the first processing unit 2X (ID=3=myID+1) to the immediate left thereof and the third processing unit 2Z (ID=1=myID−1) to the immediate right thereof.

When the program 35 is started, the second processing unit 2Y is brought into the standby state of the start of the application.

When the program start signal is output to the second processing unit 2Y, the first processing unit 2X subsequently transfers a program 36 to the processing unit 2 specified by myID−2 based on the program 34 and outputs the program start signal. The ID of the first processing unit 2X is 3, and myID−2=1 is obtained, so the first processing unit 2X transfers the program 36 to the third processing unit 2Z (ID=1) next but one on the right-hand side thereof and outputs the program start signal (see, FIG. 7).

Based on the program start signal from the first processing unit 2X, the third processing unit 2Z starts the program 36. The program 36 is programmed so that the application is executed with the processing unit 2 specified by myID+2 and the processing unit 2 specified by myID+1 cooperating with each other. Therefore, the third processing unit 2Z executes the application in cooperation with the first processing unit 2X (ID=3=myID+2) next but one on the left-hand side thereof and the second processing unit 2Y (ID=2=myID+1) to the immediate left thereof.

Upon completion of the start of the program 36 by the third processing unit 2Z, the first to third processing units 2X, 2Y, and 2Z each specify a communication target using the ID expressed by the value relative to the ID thereof when necessary and execute the application in cooperation with one another.

As described with reference to FIGS. 6 and 7, in this embodiment, because the IDs of the numbers correlative to the connection order of the processing units 2 are assigned to the processing units 2, respectively, the processing units 2 can specify the communication target using the ID expressed by the value relative to the ID thereof. As a result, the processing units 2 do not have to have the routing table and do not have to reference the routing table in the communication among the processing units 2 as described above. Thus, it is possible to improve the communication speed among processing units and improve the processing speed.

In the description with reference to FIGS. 6 and 7, the case where the three processing units 2 perform the processing in cooperation with one another is given. However, the number of processing units 2 that execute the processing in cooperation with one another is not limited to three, and may be two or four or more.

In the description with reference to FIGS. 6 and 7, the case where the three processing units 2 that are continuously arranged execute the processing in cooperation with one another is given. However, it is also possible to cause processing units that are not continuously arranged (connected) to perform the processing in cooperation with one another. That is, it is possible to cause the processing units 2 that are not continuously arranged to execute the processing in cooperation with one another by appropriately changing the information (myID+x) for specifying the communication target on the basis of the ID thereof, which is the information included in the program executed by the processing units 2.

(Processing at Time when Power is Turned Off)

Next, a description will be given on an operation at a time when the power to the processing system 100 is turned off.

Figure 8:
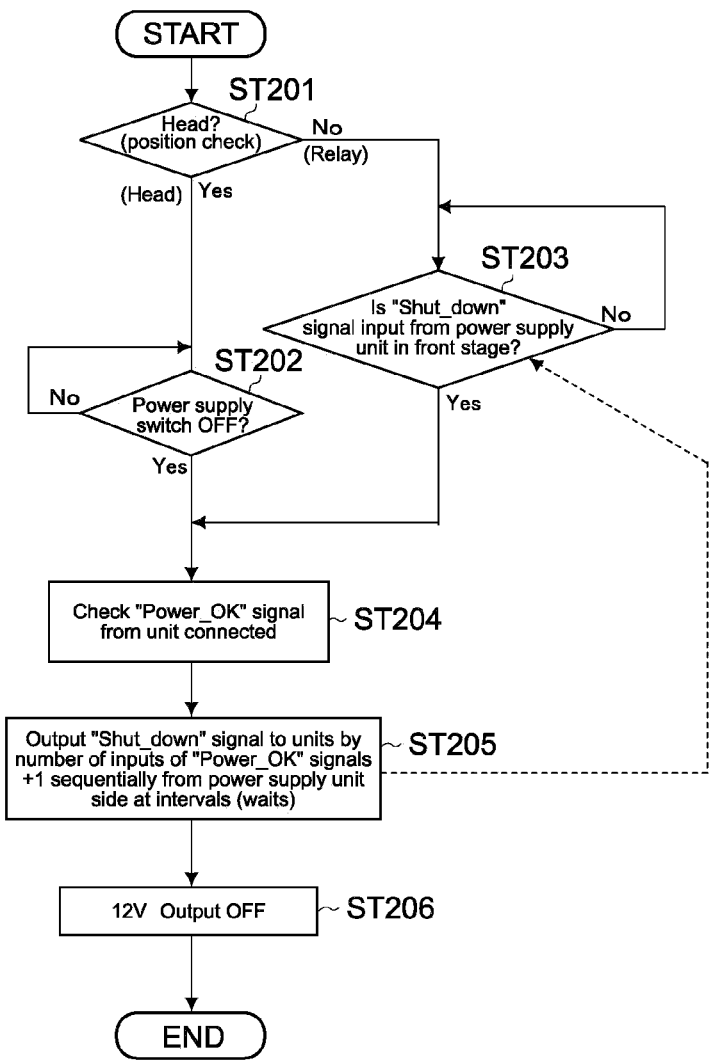
FIG. 8 is a flowchart showing an operation in the case where the power supply unit turns off the power to the processing unit.
Figure 9:
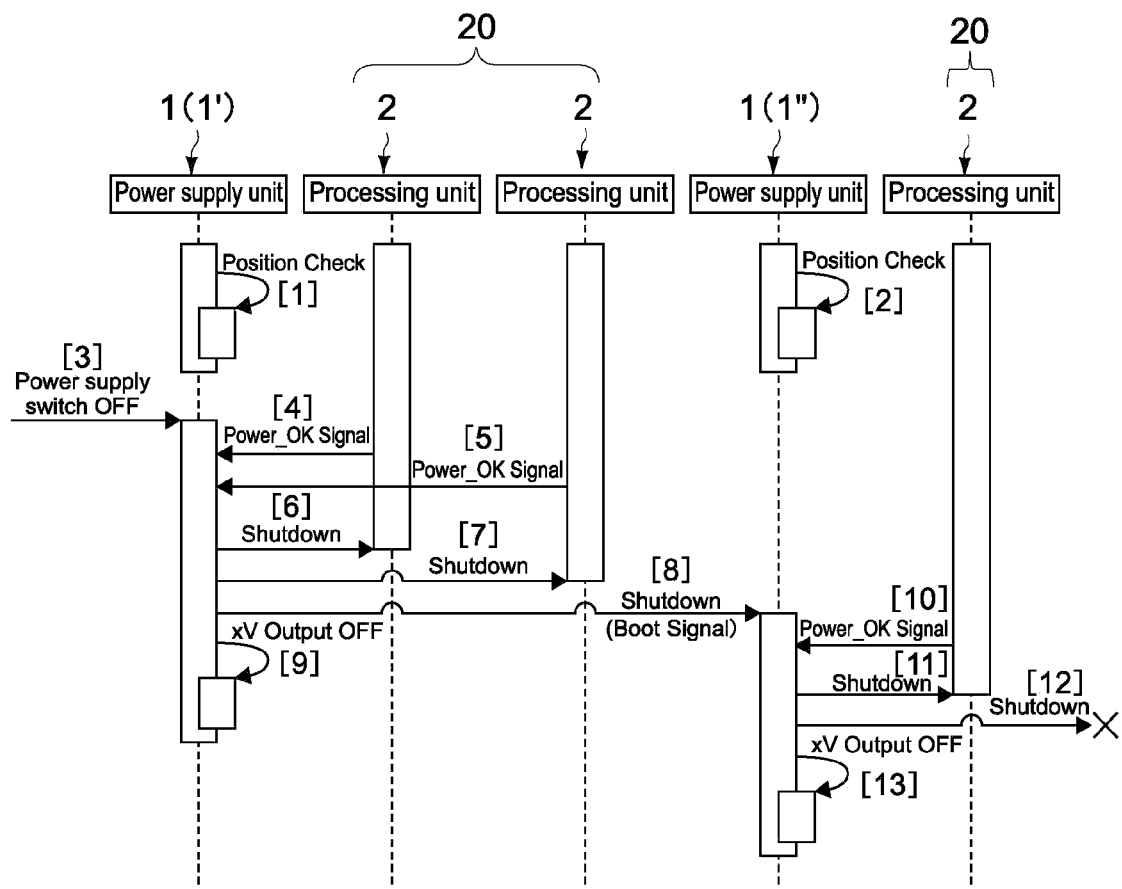
FIG. 9 is a sequence diagram showing a turn-off operation of the power to the processing system according to the embodiment of the present invention.

FIG. 8 is a flowchart showing an operation in a case where the power supply unit turns off the power to the processing unit. FIG. 9 is a sequence diagram showing the operation at the time when the power to the processing system is turned off. It should be noted that in FIG. 9, the structure of the processing system 100 is simplified for ease of the explanation.

The microcontroller 5 of the power supply unit 1 judges whether the power supply unit 1 concerned is the head power supply unit 1' or the relay power supply unit 1" based on the relationship between the other power supply unit 1 (Step 201) (see, FIG. 9 and [2]).

When it is judged that the power supply unit 1 concerned is the head power supply unit 1' (YES in Step 201), the microcontroller 5 judges whether the user presses the power supply switch 15, and a signal of turning off the power supply switch is input from the power supply switch 15 (Step 202).

When the user presses the power supply switch 15, and the signal of turning off the power supply switch is input (YES in Step 202), the microcontroller 5 performs the subsequent processing of Step 204. On the other hand, when the signal of turning off the power supply switch is not input from the power supply switch 15 (NO in Step 202), the microcontroller 5 performs the processing of Step 202 again and judges whether the signal of turning off the power supply switch is input.

That is, when the power supply unit 1 concerned is judged to be the head power supply unit 1', the power supply unit 1' is brought into a standby state of turning off the power to the power supply switch 15 provided thereto.

In Step 201, when the power supply unit 1 concerned is not judged to be the head power supply unit 1' (NO in Step 201), that is, when the power supply unit 1 is judged to be the relay power supply unit 1", the microcontroller 5 performs the processing of Step 203.

In Step 203, the microcontroller 5 judges whether a "Shut_down" signal is input from the power supply unit 1 in the front stage.

In the case where the "Shut_down" signal is input from the power supply unit 1 in the front stage (YES in Step 203), the microcontroller 5 performs the subsequent processing of Step 204. On the other hand, in the case where the "Shut_down" signal is not input from the power supply unit 1 in the front stage (NO in Step 203), the microcontroller 5 performs the processing of Step 203 again to judge whether the "Shut_down" signal is input from the power supply unit 1 in the front stage.

In other words, when it is judged that the power supply unit 1 concerned is the relay power supply unit 1", the power supply unit 1" is brought into a standby state of the input of the "Shut_down" signal from the power supply unit 1 in the front stage.

In the case where the power supply unit 1 is the head power supply unit 1', when the signal of turning off the power supply switch is input from the power supply switch 15 (YES in Step 202) (see, FIG. 9), or in the case where the power supply unit 1 concerned is the relay power supply unit 1", when the "Shutdown" signal is input from the power supply unit 1 in the front stage (YES in Step 203) (see, FIG. 9), the processing of Step 204 is performed.

In Step 204, the inputs of "Power_OK." signals from the processing unit group 20 connected thereto are counted. As described above, when the voltage of 12 V is supplied from the power supply unit 1, the processing unit 2 outputs the "Power_OK" signal to the power supply unit 1 (see, FIG. 9, [5], and [10]). Therefore, in Step 204, the microcontroller 5 only has to count the "Power_OK" signals. As a result, the microcontroller 5 of the power supply unit 1 can obtain the number of processing units 2 connected thereto.

When the inputs of the "Power_OK" signals are counted, the microcontroller 5 outputs the "Shut_down" signal (shutdown control signal) to the units 1 and 2 by the number of inputs of the "Power_OK" signals plus one in sequence from the side on which the connected position is close to the power supply unit 1 (Step 205) (see, FIG. 9, [7], [8], [11], and [12]).

Here, the microcontroller 5 outputs the "Shut_down" signals to the units by the number of inputs of the "Power_OK" signals plus one. Therefore, in the case where the other power supply unit 1 is connected in the rear stage, the "Shut_down" signal is input to the power supply unit in the rear stage (Step 203) (see, FIG. 9).

On the other hand, in the case where the other power supply unit 1 is not connected in the rear stage, that is, the power supply unit 1 concerned is the power supply unit 1 of the last stage, the (number of inputs of "Power_OK." signals+1)-th "Shut_down" signal output comes to nothing (see, FIG. 9).

When the "Shut_down" signal is output, the microcontroller 5 terminates the supply of the voltage of 12 V to the processing unit group 20 connected thereto (Step 206) (see, FIG. 9 and [13]) and terminates the processing.

By the processings shown in FIG. 8, the power supply units 1 can sequentially shut down the processing units 2 connected thereto from the front stage side and can sequentially shut down the processing units 2 that constitute the processing system 100 from the front stage side in conjunction with the other power supply unit 1. As a result, it is possible to avoid the above-mentioned problem of the order of the turning-off of the power in the case where the PCI-Express is used for the connection of the units.

Second Embodiment

Next, a second embodiment of the present invention will be described.

It should be noted that in the description of the second embodiment, portions having the same structures and functions as those in the first embodiment will be denoted by the same reference numerals or symbols, and their descriptions will be omitted or simplified.

(Structure of Processing System)

Figure 10:
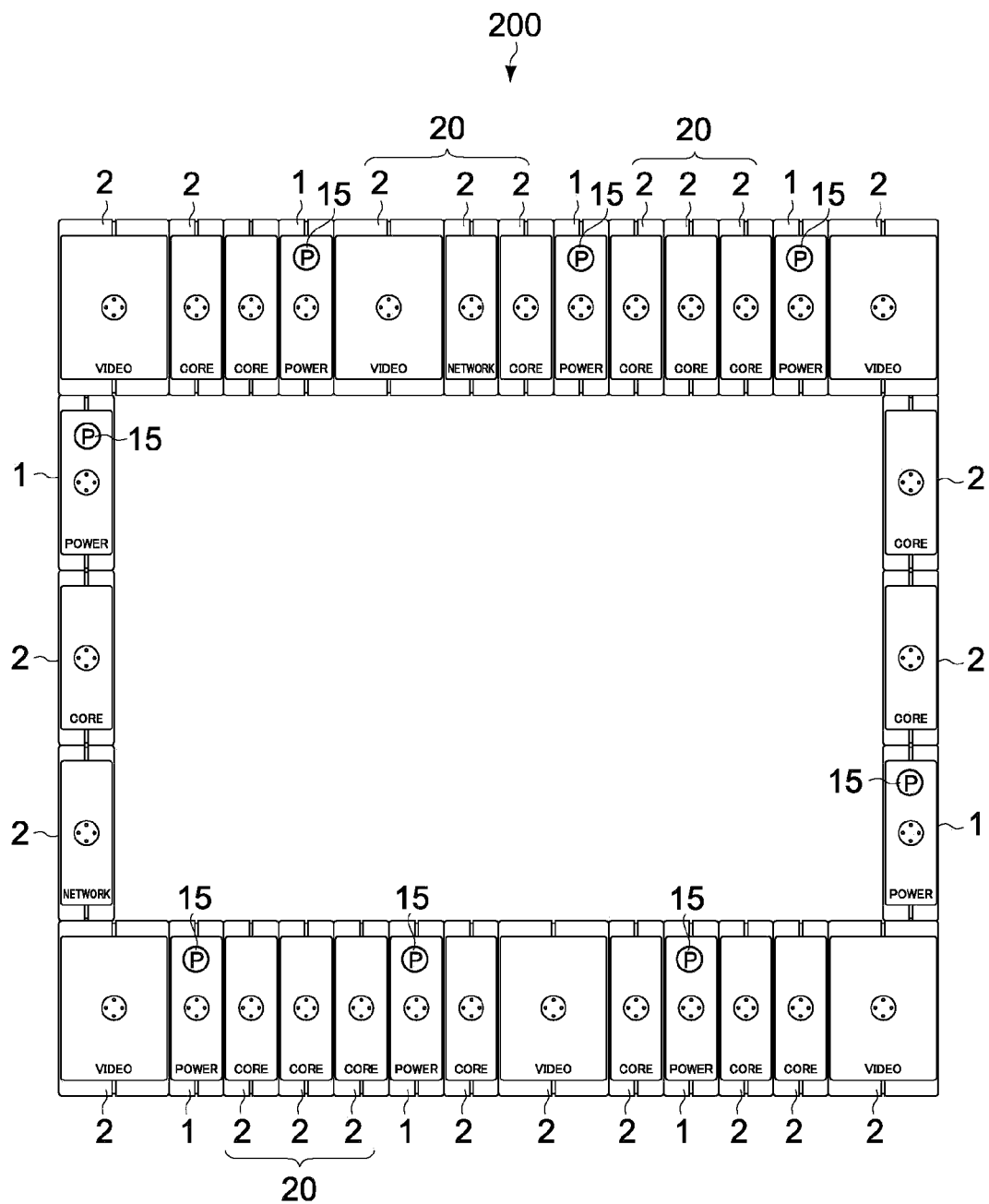
FIG. 10 is a diagram showing a processing system according to another embodiment of the present invention.

FIG. 10 is a diagram showing a processing system according to this embodiment.

As shown in FIG. 10, a processing system 200 is formed by arranging the units 1 and 2 in a ring-shaped form.

As in the first embodiment, the user can arbitrarily select necessary units from among the power supply unit 1, the operation unit 2A, the video unit 2B, and the network unit 2C in accordance with the necessary size to structure the processing system 200 also in the second embodiment. It should be noted that the maximum number of processing units 2 connected to one power supply unit 1 is preset, for example, to four as in the first embodiment.

Here, as shown in FIG. 10, in the processing system 200 in the second embodiment, the units 1 and 2 are arranged in the ring-shaped form, so the forefront (head unit) is not defined in the positional relationship among the power supply units 1. In this case, it may be impossible for each of the power supply units 1 to judge whether to be the head power supply unit 1' or the relay power supply unit 1" in the positional relationship with the other power supply units 1. In this case, there arises a problem in that, in each of the power supply units 1 that constitute the processing system 200, it is difficult to determine from which processing unit 2 the startup and shutdown operations are started.

In view of this, in the case where the power supply switch 15 provided to the power supply unit 1 according to this embodiment is pressed, the power supply unit 1 serves as the head power supply unit 1', and the turning-on and turning-off of the powers to the processing units 2 are controlled in a predetermined order.

(Description on Operation)

A detailed description will be given on the operation of the processing system 200. It should be noted that the operation of the power supply unit 1 will be mainly described in the description on the operation of the processing system 200.

(Processing at Time when Power is Turned on)

First, the processing at a time when the power to the processing system 200 is turned on will be described.

Figure 11:
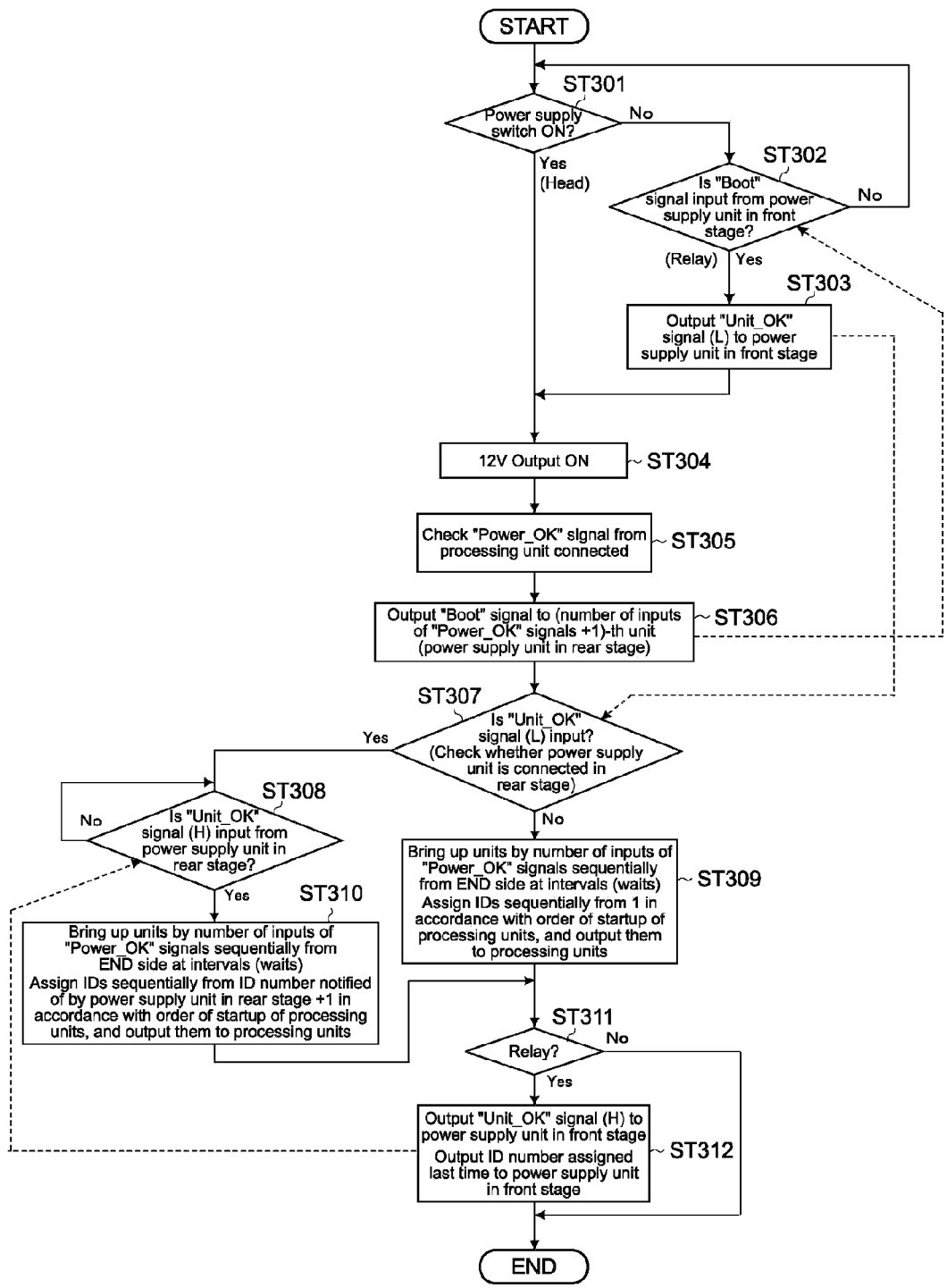
FIG. 11 is a flowchart showing an operation in the case where the power supply unit turns on the powers to the processing units and assigns IDs of numbers corresponding to an order of startup to the processing units.
Figure 12:
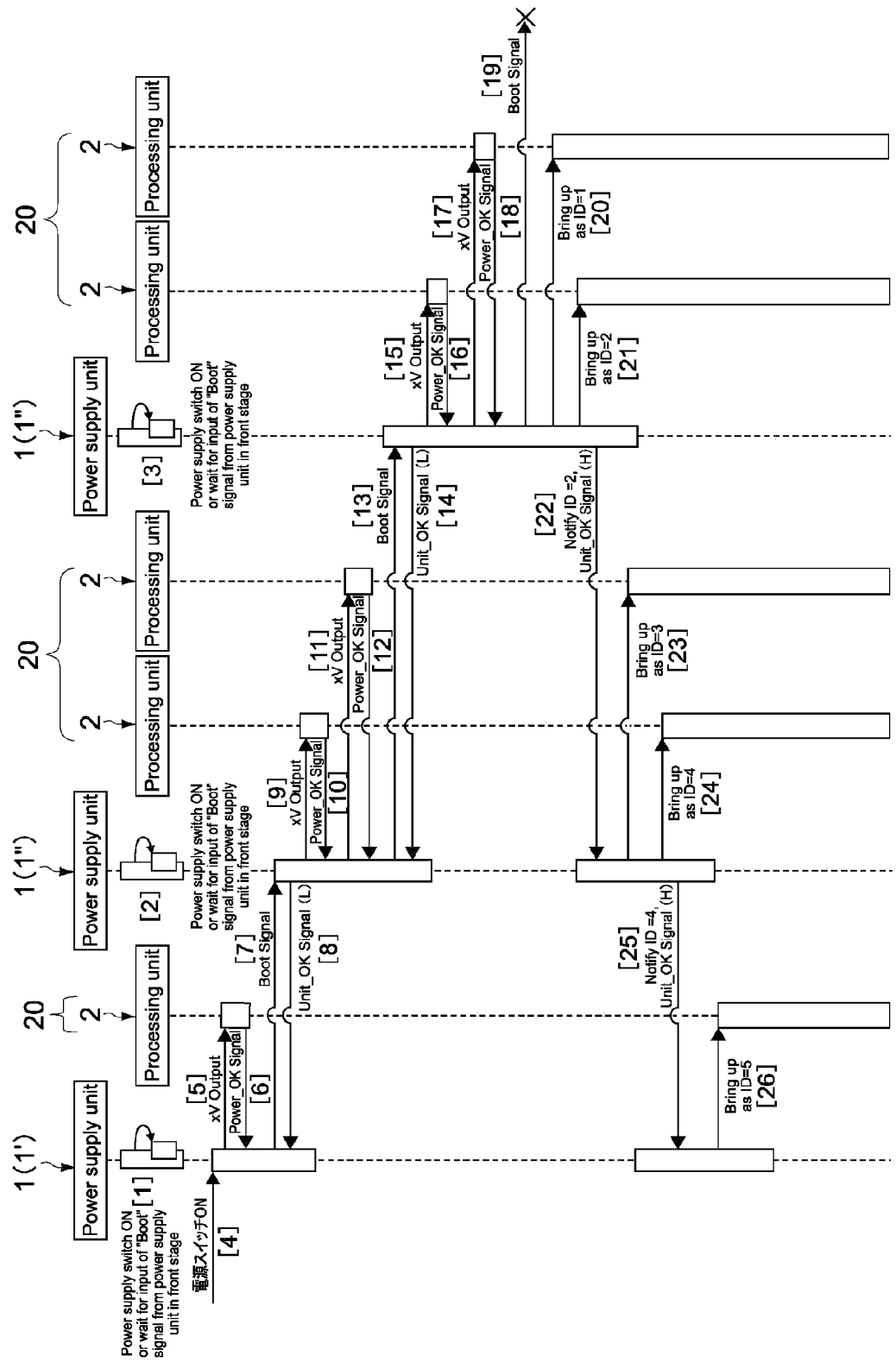
FIG. 12 is a sequence diagram showing a startup operation of the processing system according to the other embodiment of the present invention.

FIG. 11 is a flowchart showing an operation in the case where the power supply unit turns on the powers to the processing units and assigns IDs of numbers corresponding to the order of the turning-on to the processing units. FIG. 12 is a sequence diagram showing the operations at the time of turning on the powers to the processing units. In FIG. 12, the structure of the processing system 200 is simplified for ease of the explanation. In the description of FIG. 11, points different from those of FIG. 4 will be mainly described.

As shown in FIG. 11, the microcontroller 5 of the power supply unit 1 judges whether the power supply switch 15 provided to the power supply unit 1 concerned is pressed, and a signal of turning on the power supply switch is input from the power supply switch 15 (Step 301).

In the case where the signal of turning on the power supply switch is not input from the power supply switch 15 (NO in Step 301), the microcontroller 5 judges whether the "Boot" signal is input from the power supply unit 1 in the front stage (Step 302).

In the case where the "Boot" signal is not input from the power supply unit 1 in the front stage (NO in Step 302), the microcontroller 5 performs the processing of Step 301 again to judge whether the signal of turning on the power supply switch is input from the power supply switch 15.

That is, the power supply units 1 each are brought into the standby state of the input of the signal of turning on the power supply switch from the power supply switch 15 thereof or the input of the "Boot" signal from the power supply unit 1 in the front stage (see, FIG. 12, [2], and [3]).

In Step 301, in the case where the power supply switch 15 is pressed by the user (YES in Step 301) (see, FIG. 12), the microcontroller 5 supplies the voltage of 12 V to the processing unit group 20 connected thereto (Step 304) (see, FIG. 12). It should be noted that in the case where the power supply switch 15 is pressed by the user, the power supply unit 1 including the power supply switch 15 concerned recognizes that the power supply unit 1 is the head power supply unit 1'.

In Step 302, in the case where the "Boot" signal is input from the power supply unit 1 in the front stage (YES in Step 302) (see, FIG. 12 and [13]), the microcontroller 5 outputs the "Unit_OK." signal (L) to the power supply unit 1 in the front stage (Step 303) (see, FIG. 12 and [14]). It should be noted that in the case where the "Boot" signal is input from the power supply unit 1 in the front stage, the power supply unit 1 concerned recognizes that the power supply unit 1 is the relay power supply unit 1".

When the "Unit_OK." signal (L) is output to the power supply unit 1 in the front stage, the microcontroller 5 supplies the voltage of 12 V to the processing unit group 20 connected thereto (Step 304) (see, FIG. 12, [11], [15], and [17]).

It should be noted that the processings subsequent to Step 304 are the same as those subsequent to Step 105 of FIG. 4, so their descriptions will be omitted.

Figure 15:
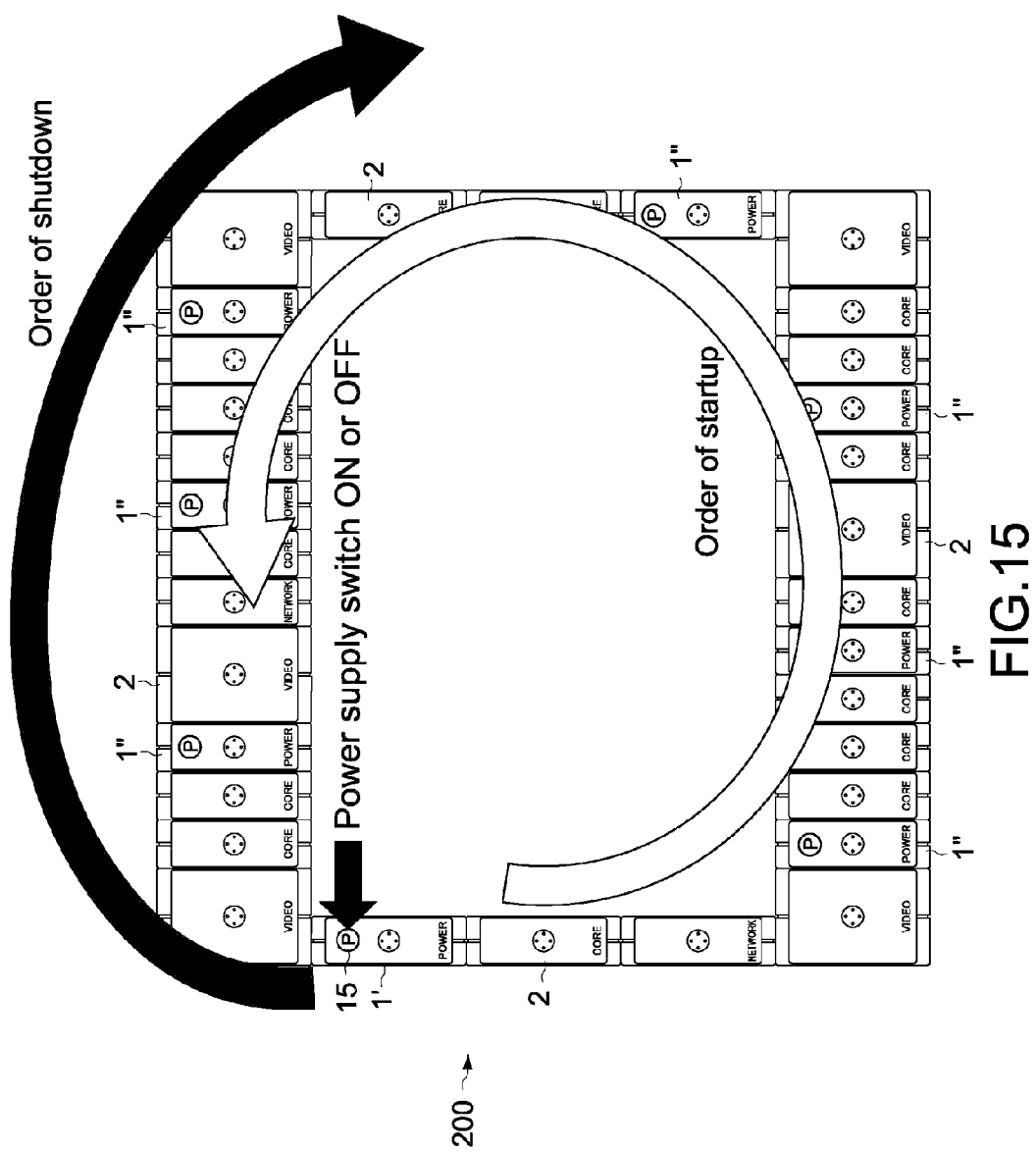
FIG. 15 is a diagram showing an example of an order of a startup of the processing system in the case where the processing shown in FIG. 11 is performed, and showing an example of an order of the shutdown of the processing system in the case where the processing shown in FIG. 13 is performed.

FIG. 15 is a diagram showing an example of an order of turning-on of the powers to the processing system in the case where the processings shown in FIG. 11 are executed.

As shown in FIG. 15, in the case where the user presses the power supply switch 15 of one power supply unit 1 out of the plurality of power supply units 1 that constitute the processing system 200, the power supply unit 1 concerned is set as the head power supply unit 1'. Further, the other power supply units serve as the relay power supply units 1".

Then, the power supply units 1 are interlocked to turn on the powers to the processing units 2 in sequence from the processing unit 2 that is farthest from the head power supply unit 1' in the electrical connection relationship (from the processing unit 2 below the head power supply unit 1' in FIG. 15). Subsequently, the power supply units 1 are interlocked to assign, to the processing units, respectively, the IDs of numbers corresponding to the order of the turning-on of the powers.

As a result, as shown in FIG. 15, the powers to the processing units 2 are turned on in sequence from the head power supply unit 1' side counterclockwise, and in accordance with the order of the turning-on of the powers, the IDs are assigned from the processing unit with the ID=1 counterclockwise.

As described above, in the second embodiment, the powers are turned on with the power supply unit 1 whose power supply switch 15 is pressed being as a standard, making it possible to deal with the case where the processing unit 200 is structured in the ring-shaped form. In addition, as in the first embodiment, the IDs correlative to the order of connection are assigned to the processing units, respectively, also in the second embodiment, with the result that the processing units 2 each can specify the communication target using the ID expressed by the value relative to the ID thereof. As a result, it is possible to improve the communication speed among the processing units and can improve the processing speed.

It should be noted that FIG. 15 shows the case where the powers are turned on counterclockwise. However, in the case where the electrical connection relationship of the units 1 and 2 is established in a reverse direction, the order of turning on the powers to the processing units 2 is set to be clockwise.

(Processing at Time when Power is Turned Off)

Next, a description will be given on an operation at a time when the power to the processing system 200 is turned off.

Figure 13:
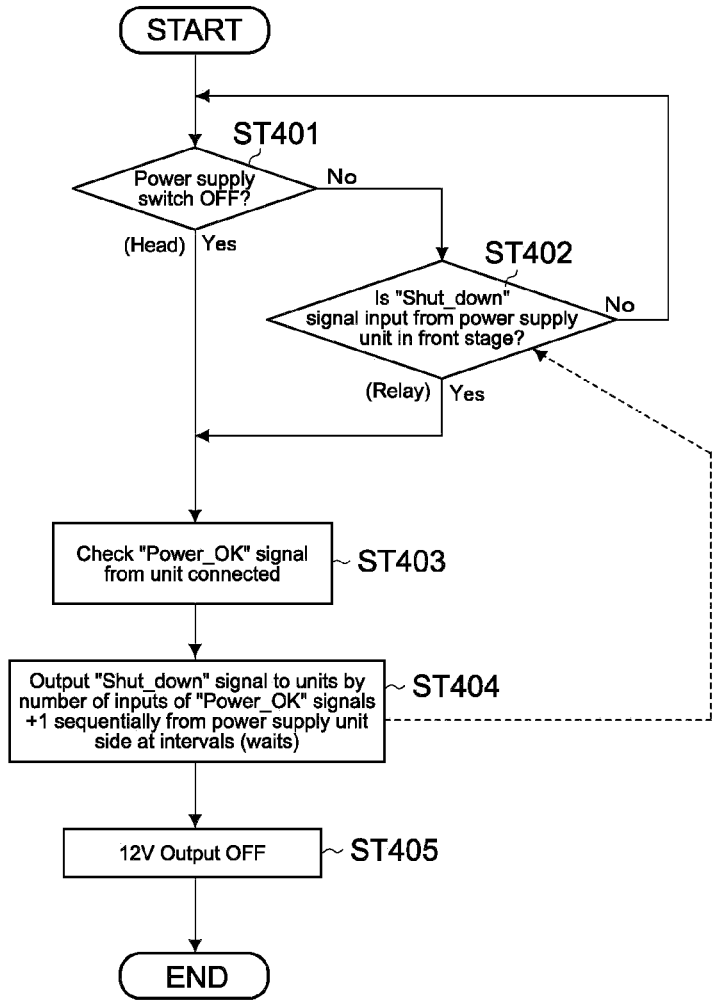
FIG. 13 is a flowchart showing an operation in the case where the power supply unit turns off the power to the processing unit.
Figure 14:
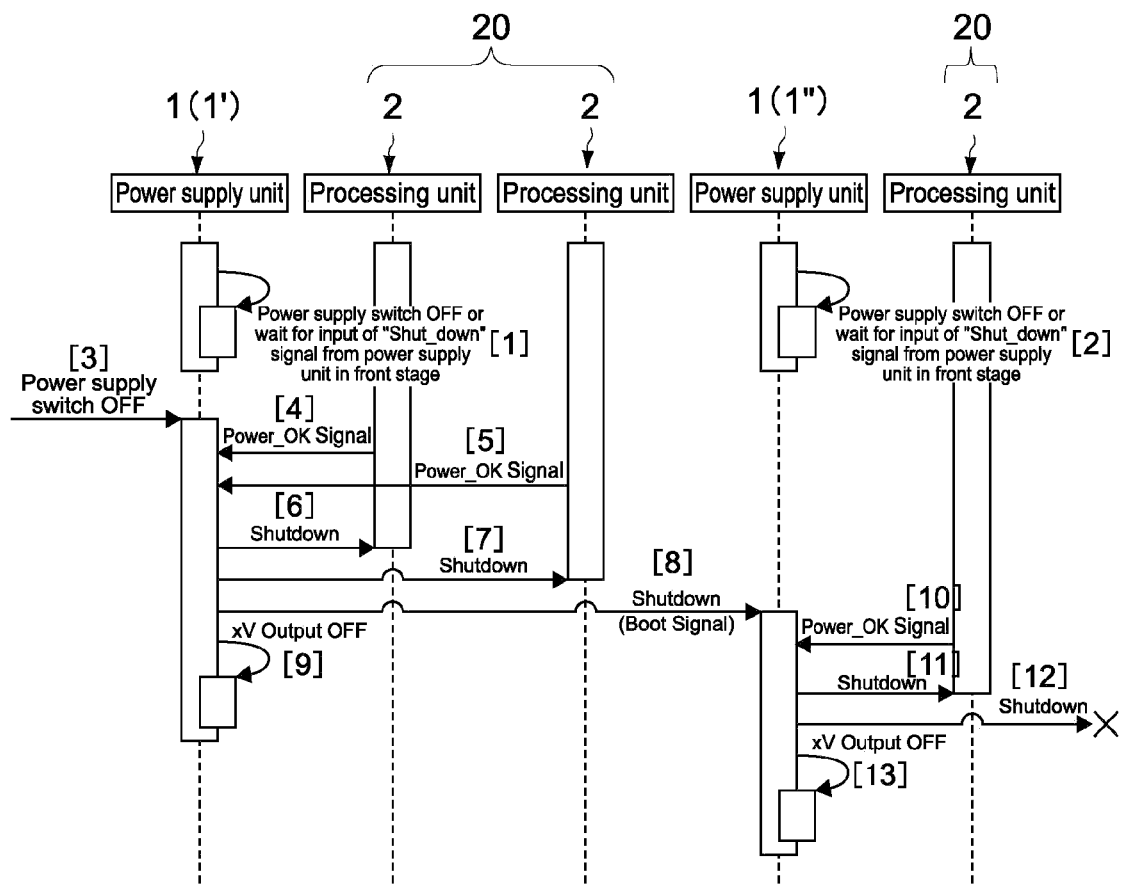
FIG. 14 is a sequence diagram showing a turn-off operation of the power to the processing system according to the other embodiment of the present invention.

FIG. 13 is a flowchart showing an operation in the case where the power supply unit turns off the powers to the processing units. FIG. 14 is a sequence diagram showing the operation of turning off the power to the processing system. In FIG. 14, the structure of the processing system 200 is simplified for ease of the explanation. In the description of FIG. 13, points different from those of FIG. 8 will be mainly described.

As shown in FIG. 13, the microcontroller 5 of the power supply unit 1 judges whether the power supply switch 15 provided to the power supply unit 1 concerned is pressed, and a signal of turning off the power supply switch is input from the power supply switch 15 (Step 401).

In the case where the signal of turning off the power supply switch is not input from the power supply switch 15 (NO in Step 401), the microcontroller 5 judges whether the "Shut_down" signal is input from the power supply unit 1 in the front stage (Step 402).

In the case where the "Shut_down" signal is not input from the power supply unit 1 in the front stage (NO in Step 402), the microcontroller 5 performs the processing of Step 401 again to judge whether the signal of turning off the power supply switch is input from the power supply switch 15.

That is, the power supply units 1 are brought into the standby state of the input of the signal of turning off the power supply switch from the power supply switch 15 thereof or the input of the "Shut_down" signal from the power supply unit 1 in the front stage (see, FIG. 14 and [2]).

In Step 401, in the case where the power supply switch 15 is pressed by the user (YES in Step 401) (see, FIG. 14), the microcontroller 5 counts the inputs of the "Power_OK." signals from the processing unit group 20 connected thereto (Step 403) (see, FIG. 14 and [5]). It should be noted that in the case where the power supply switch 15 is pressed by the user, the power supply unit 1 including the power supply switch 15 concerned is set as the head power supply unit 1'.

In Step 402, in the case where the "Shut_down" signal is input from the power supply unit 1 in the front stage (YES in Step 402) (see, FIG. 14), the microcontroller 5 performs the subsequent step of Step 403. It should be noted that in the case where the "Shut_down" signal is input from the power supply unit 1 in the front stage, the power supply unit 1 concerned is set as the relay power supply unit 1".

It should be noted that the processings subsequent to Step 403 are the same as those subsequent to Step 204 of FIG. 8, so their descriptions will be omitted.

FIG. 15 shows an example of an order of shutdown of the processing units 2 in the case where the processing shown in FIG. 13 is executed.

As shown in FIG. 15, in the case where the user presses the power supply switch 15 of one power supply unit 1 out of the plurality of power supply units 1 that constitute the processing system 200, the power supply unit 1 concerned is set as the head power supply unit 1'. Further, the other power supply units serve as the relay power supply units 1".

Then, the power supply units 1 are interlocked to turn off the powers to the processing units 2 sequentially from the processing unit 2 that is closest to the head power supply unit 1' in the electrical connection relationship (from the processing unit 2 above the head power supply unit 1' in FIG. 15). As a result, as shown in FIG. 15, the shutdown operation is performed in sequence clockwise from the head power supply unit 1'. Thus, it is possible to avoid the problem of the order of shutdown operation in the case where the PCI-Express is used for the connection of the units described above.

It should be noted that FIG. 15 shows the case where the powers are turned off clockwise. However, in the case where the electrical connection relationship of the units 1 and 2 is established in the reversed direction, the powers of the processing units 2 are turned off counterclockwise.

VARIOUS MODIFIED EXAMPLES

In the first embodiment described above, the case where the units 1 and 2 have the linear positional relationship is described with reference to FIGS. 1, 2, and the like. However, the positional relationship among the units 1 and 2 is not limited to this. Typically, any positional relationship among the units 1 and 2 can be applied, as long as the electrical connection relationship among the units 1 and 2 is a serial relationship.

The same holds true for the processing system 200 according to the second embodiment. That is, any positional relationship among the units 1 and 2 may be applied, as long as the electrical connection relationship among the units 1 and 2 is the ring-shaped form.

The present application contains subject matter related to that disclosed in Japanese Priority Patent Application JP 2009-189500 filed in the Japan Patent Office on Aug. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply unit, comprising:
   a communication unit configured to communicate with a first processing unit group and with a second power supply unit, the first processing unit group including a plurality of processing units connected thereto; and
   a control unit configured to
      determine whether the power supply unit is a head power supply unit or a relay power supply unit with respect to the second power supply unit,
      control powers to the plurality of processing units through the communication so that the powers are turned on in an order corresponding to an order of connection, and
      assign, to the plurality of processing units, respectively, IDs of numbers corresponding to the order of turning-on of the powers each time the power is turned on.

2. The power supply unit according to claim 1, wherein:
   the communication unit is capable of performing communication with at least one different power supply unit that is connected to a second processing unit group, the second processing unit group being different from the first processing unit group, the at least one different power supply unit being controlling powers to the second processing unit group, and
   the control unit controls the powers to the first processing unit group so that the powers are turned on in a predetermined priority order with respect to turning-on of powers to the second processing unit group through the communication with the different power supply unit, and assigns the IDs of the numbers to the plurality of the processing units, respectively, the numbers corresponding to numbers in accordance with the priority order of turning-on of the powers to the first processing unit group with respect to turning-on of the powers to the second processing unit group and corresponding to the order of turning-on of the powers in the first processing unit group.

3. The power supply unit according to claim 2, wherein the control unit controls the powers so that the plurality of processing units in the first processing unit group are sequentially started up from a rear stage side in an electrical connection relationship.

4. The power supply unit according to claim 3, wherein the control unit outputs a confirmation signal that confirms whether the different power supply unit in a rear stage is connected to the rear stage side in the electrical connection relationship, and judges whether a response signal to the confirmation signal is input from the different power supply unit in the rear stage.

5. The power supply unit according to claim 4, wherein, when the response signal is not input, the control unit controls the powers so that the first processing unit group is started up sequentially from the rear stage side, and when the response signal is input, the control unit controls the powers so that the first processing unit group connected thereto is started up sequentially from the rear stage side after a startup completion signal is input, the startup completion signal indicating that startup of the second processing unit group connected to the different power supply unit in the rear stage is completed.

6. The power supply unit according to claim 5, wherein, when the response signal is not input, the control unit assigns the IDs of the numbers corresponding to the order of turning-on to the plurality of processing units, respectively, and outputs, to the different power supply unit in a front stage, information of the number of the ID assigned last time, and when the response signal is input, the control unit assigns the IDs of the numbers corresponding to the order of turning-on to the plurality of the processing units, respectively, based on information of the number of the ID from the different power supply unit in the rear stage, and outputs, to the different power supply unit in the front stage, information of the number of the ID assigned last time.

7. The power supply unit according to claim 2, wherein the control unit (a) judges whether the power supply unit is a head power supply unit or a relay power supply unit in a relationship with the different power supply unit, (b) controls, based on a judgment result as to whether the power supply unit is the head power supply unit or the relay power supply unit, the powers so that the powers to the first processing unit group are turned on in the predetermined priority order with respect to the turning-on of the powers to the second processing unit group through the communication with the different power supply unit, and c) assigns the IDs of the numbers to the plurality of processing units, respectively, the numbers corresponding to the order of turning-on of the powers in the first processing unit group and corresponding to the priority order of turning-on of the first processing unit group with respect to turning-on of the powers to the second processing unit group.

8. The power supply unit according to claim 7, further comprising a power supply switch, wherein the control unit judges, based on a shift of the power supply switch thereof, that the power supply unit including the power supply switch shifted is the head power supply unit in the relationship with the different power supply unit.

9. A processing system, comprising:
a processing unit group including a plurality of processing units; and
a power supply unit including:
   a communication unit that communicates with the processing unit group connected thereto and with a second power supply unit, and
   a control unit configured to (a) determine whether the power supply unit is a head power supply unit or a relay power supply unit with respect to the second power supply unit, (b) control powers to the plurality of processing units through the communication so that the powers are turned on in an order corresponding to an order of connection, and (c) assign, to the plurality of processing units, respectively, IDs of numbers corresponding to the order of turning-on of the powers each time the power is turned on.

10. A processing system, comprising:
a plurality of processing unit groups each including a plurality of processing units; and
a plurality of power supply units each including a communication unit and a control unit, wherein:
the communication unit that communicates with a first processing unit group connected thereto and with at least one different power supply unit that is connected with a second processing unit group different from the first processing unit group and controls powers to the second processing unit group, and
the control unit is configured to (a) determine whether the power supply unit is a head power supply unit or a relay power supply unit with respect to the at least one different power supply unit, (b) control the powers to the first processing unit group so that the powers are turned on in an order corresponding to an order of connection through the communication with the first processing unit group and so that the powers of the first processing unit group are turned on in a predetermined priority order with respect to turning-on of powers to the second processing unit group through the communication with the different power supply unit, and (c) assign the IDs of the numbers to the plurality of the processing units, respectively, the numbers corresponding to numbers in accordance with the priority order of turning-on of the powers to the first processing unit group with respect to turning-on of the powers to the second processing unit group and corresponding to the order of turning-on of the powers in the first processing unit group.

11. An ID assignment method, comprising:
determining whether a first power supply unit is a head power supply unit or a relay power supply unit with respect to a second power supply unit;
controlling powers to a plurality of processing units connected to the first power supply unit through communication with the plurality of processing units so that the powers to the plurality of processing units are turned on in an order corresponding to an order of connection; and
assigning, to the plurality of processing units, respectively, IDs of numbers corresponding to the order of turning-on of the powers each time the power is turned on.

* * * * *